(12) United States Patent
Hori et al.

(10) Patent No.: US 7,783,895 B2
(45) Date of Patent: Aug. 24, 2010

(54) METHOD AND APPARATUS FOR ENCRYPTING DATA TO BE SECURED AND INPUTTING/OUTPUTTING THE SAME

(75) Inventors: Yoshihiro Hori, Moriguchi (JP); Yuichi Kanai, Moriguchi (JP); Ryoji Ohno, Matsudo (JP); Takeo Ohishi, Yokohama (JP); Kenichiro Tada, Tokorozawa (JP); Tatsuya Hirai, Yokohama (JP); Masafumi Tsuru, Chiyoda-ku (JP); Takayuki Hasebe, Kawasaki (JP)

(73) Assignees: Sanyo Electric Co., Ltd., Osaka (JP); Sharp Corporation, Osaka (JP); Victor Company of Japan Limited, Yokohama (JP); Pioneer Corporation, Tokyo (JP); Fujitsu Limited, Kanagawa (JP); Hitachi Global Storage Technologies Japan, Ltd., Kanagawa-ken (JP)

( * ) Notice: Subject to any disclaimer, the term of this patent is extended or adjusted under 35 U.S.C. 154(b) by 1218 days.

(21) Appl. No.: 10/809,789

(22) Filed: Mar. 26, 2004

(65) Prior Publication Data
US 2004/0249993 A1    Dec. 9, 2004

(30) Foreign Application Priority Data
Mar. 27, 2003    (JP) ............................. 2003-089388

(51) Int. Cl.
*G06F 11/30* (2006.01)
*H04K 1/00* (2006.01)
(52) U.S. Cl. ...................................... 713/189; 380/287
(58) Field of Classification Search ................. 713/189; 380/287, 277
See application file for complete search history.

(56) References Cited

U.S. PATENT DOCUMENTS

| | | | | |
|---|---|---|---|---|
| 4,755,660 A | * | 7/1988 | Nakano | 235/380 |
| 5,883,957 A | * | 3/1999 | Moline et al. | 705/57 |
| 6,260,120 B1 | * | 7/2001 | Blumenau et al. | 711/152 |
| 6,411,714 B1 | * | 6/2002 | Yoshiura et al. | 380/269 |
| 6,438,670 B1 | * | 8/2002 | McClannahan | 711/167 |

(Continued)

FOREIGN PATENT DOCUMENTS

JP    05-089000    4/1993

(Continued)

OTHER PUBLICATIONS

Chinese Office Action for corresponding Chinese Application No. 200410031483.8 dated Aug. 5, 2005.

(Continued)

*Primary Examiner*—Emmanuel L Moise
*Assistant Examiner*—Techane J Gergiso
(74) *Attorney, Agent, or Firm*—McDermott Will & Emery LLP

(57) ABSTRACT

A controller of a recording device issues a secure command to a storage device, and then waits the time estimated necessary for the storage device to execute the secure command before issuing the next secure command. When a controller of the storage device is executing the previous command, it notifies the recording device of being in process. When the previous command has been completed normally, the controller moves to the next process. Information for estimating the execution time of the command is obtained from the storage device in advance.

6 Claims, 20 Drawing Sheets

U.S. PATENT DOCUMENTS

| | | | |
|---|---|---|---|
| 6,519,715 B1* | 2/2003 | Takashi et al. | 714/32 |
| 6,519,716 B1* | 2/2003 | Branstad | 714/36 |
| 6,834,326 B1* | 12/2004 | Wang et al. | 711/114 |
| 7,082,539 B1* | 7/2006 | Kitahara et al. | 713/189 |
| 7,099,479 B1* | 8/2006 | Ishibashi et al. | 380/281 |
| 7,120,251 B1* | 10/2006 | Kawada et al. | 380/201 |
| 2002/0051544 A1* | 5/2002 | Kikuchi et al. | 380/277 |
| 2003/0099357 A1* | 5/2003 | Ryu et al. | 380/252 |
| 2003/0105720 A1* | 6/2003 | Ishibashi | 705/52 |
| 2003/0177379 A1* | 9/2003 | Hori et al. | 713/193 |
| 2003/0200398 A1* | 10/2003 | Harris | 711/152 |

FOREIGN PATENT DOCUMENTS

| | | |
|---|---|---|
| JP | 05-303528 | 11/1993 |
| JP | 06-004466 | 1/1994 |
| JP | 06-274440 | 9/1994 |
| JP | 07-203362 | 8/1995 |
| JP | 08-130714 | 5/1996 |
| JP | 09-153008 | 6/1997 |
| JP | 11-149414 | 6/1999 |
| JP | 2000-173158 A | 6/2000 |
| JP | 2001-160064 | 6/2001 |
| JP | 2002-124019 | 4/2002 |
| JP | 2002-204229 | 7/2002 |
| JP | 2002-268550 | 9/2002 |
| JP | 2002-367236 | 12/2002 |

OTHER PUBLICATIONS

Notification of Reasons for Rejection; Dispatch Date Nov. 30, 2005; Patent Application 10-2004-0020698.

Japanese Notification of Reason(s) for Refusal, w/ English translation thereof, issued in Japanese Patent Application No. JP 2003-089388 dated Mar. 3, 2009.

Japanese Decision of Refusal, w/ English translation thereof, issued in Japanese Patent Application No. JP 2003-089388 dated Aug. 4, 2009.

* cited by examiner

METHOD AND APPARATUS FOR ENCRYPTING DATA TO BE SECURED AND INPUTTING/OUTPUTTING THE SAME

BACKGROUND OF THE INVENTION

1. Field of the Invention

The present invention relates to a data input/output technology, and more particularly to a technology for encrypting data to be secured and inputting/outputting the same between a storage device and a host device.

2. Description of the Related Art

Recently, storage cells have shown significant advances in miniaturization, integration, and mass production, thereby allowing recording media of smaller sizes, larger capacities, and lower prices. Under the circumstances, the inventors have aimed to achieve recording media of yet higher convenience, and contemplated the configuration that a large-capacity hard disk, which has heretofore been connected fixedly to a single host device in typical uses, is rendered detachable from host devices so that it can be handled as a removable medium capable of sharing data between a plurality of host devices. It is highly advantageous if a hard disk of small size, large capacity, and relative high access speed can be used as a removable medium.

For example, see Japanese Patent Laid-Open Publication No. 2000-173158 (its entirety incorporated herein by reference).

In terms of user convenience, this removable hard disk is desirably rendered readable/writable from any host device. Nevertheless, being readable/writable from any host device can also mean the risk of data leak to third parties. Distribution of digital contents such as music and pictures is attracting attention at present. It is thus of importance to develop a technology which can protect data to be secured appropriately, for the sake of adequate copyright protection and the prevention of digital contents leakage.

SUMMARY OF THE INVENTION

The present invention has been achieved in view of the foregoing. It is thus an object of the present invention to provide a technology for improving the processing efficiency in encrypting data to be secured and inputting/outputting the same between a storage device and a host device.

One of the aspects of the present invention relates to a host device. This host device is one for inputting/outputting data to/from a storage device for retaining data. The host device comprises a controller which divides a series of cryptographic input/output processing for encrypting data to be secured and inputting/outputting the same into a plurality of procedures, and issues to the storage device a command for making the storage device execute a procedure to be executed on the storage-device side out of the procedures. The controller obtains information for estimating time necessary to execute the command from the storage device prior to the issuance of the command, issues the command to the storage device, and waits the time estimated necessary for the storage device to execute the command before it issues a command for the next procedure to the storage device.

Since the cryptographic input/output processing is divided into a plurality of procedures and the commands into smaller units, it is possible to release buses efficiently and issue other commands while executing processing that requires a relatively long time, such as encryption, decryption, a hash operation, random number generation, and log retrieval. It is inefficient to inquire of the storage device about the completion of a previous command repeatedly between the issuance of the command belonging to the cryptographic input/output processing and the issuance of the next command. Thus, the succeeding command is issued after a wait of the time estimated necessary to execute the previous command.

The information for estimation may include a typical processing time, an average processing time, or a maximum processing time necessary to execute the command. The information for estimation may include a typical processing time, an average processing time, or the maximum processing time necessary for at least one basic process out of an encrypting operation, a decrypting operation, a hash operation, a random number generating operation, and log retrieval which are used to execute the command. The time necessary to execute the command may be estimated based on the time necessary for these basic processes.

Another aspect of the present invention relates to a storage device. This storage device comprises: a storage medium which retains data; a controller which receives a command from a host device in executing a series of cryptographic input/output processing for encrypting data to be secured and inputting/outputting the same between the storage medium and the host device, the command being issued as a result of division of the cryptographic input/output processing into a plurality of procedures; and a cryptographic processing unit which executes the command. Here, in response to a request from the host device, the controller provides information from which the host device estimates the time necessary for the cryptographic processing unit to execute the command.

According to its processing procedures, the cryptographic input/output processing is divided into any of process units including: a process for receiving data input from the host device and performing encryption or decryption using the cryptographic processing unit if necessary; a process for performing encryption, decryption, or signature attachment using the cryptographic processing unit in order to output data to the host device; and a process for outputting data to the host device. Commands may be issued by each of the process units divided.

The information for estimation may include a typical processing time, an average processing time, or a maximum processing time necessary to execute the command. The information for estimation may include a typical processing time, an average processing time, or a maximum processing time necessary for at least one basic process out of an encrypting operation, a decrypting operation, a hash operation, a random number generating operation, and log retrieval which are used to execute the command.

Still another aspect of the present invention relates to a data input/output method. This method is a data input/output method for executing a series of cryptographic input/output processing for encrypting data to be secured and inputting/outputting the same between a storage device for retaining data and a host device. The method comprises: a step in which the cryptographic input/output processing is divided into a plurality of procedures, and the host device executes a procedure to be executed on the host-device side out of the procedures; a step in which the host device issues a command to the storage device in order to make the storage device execute a procedure to be executed on the storage-device side; a step in which the storage device receives the command; and a step in which the storage device executes the command. Here, the host device obtains information for estimating time necessary for the storage device to execute the command from the storage device prior to the issuance of the command, issues the command to the storage device, and waits the time estimated necessary to execute the command before it issues a command for the next procedure to the storage device.

It is to be understood that any combination of the aforementioned components and any representations of the present invention being transformed among methods, apparatus, systems, storage media, and computer programs are also valid as the aspects of the present invention.

Moreover, this summary of the invention does not necessarily describe all necessary features so that the invention may also be sub-combination of these described features.

DETAILED DESCRIPTION OF THE INVENTION

The invention will now be described based on embodiments which do not intend to limit the scope of the present invention but exemplify the invention. All of the features and the combinations thereof described in the embodiments are not necessarily essential to the invention.

First Embodiment

Figure 1:
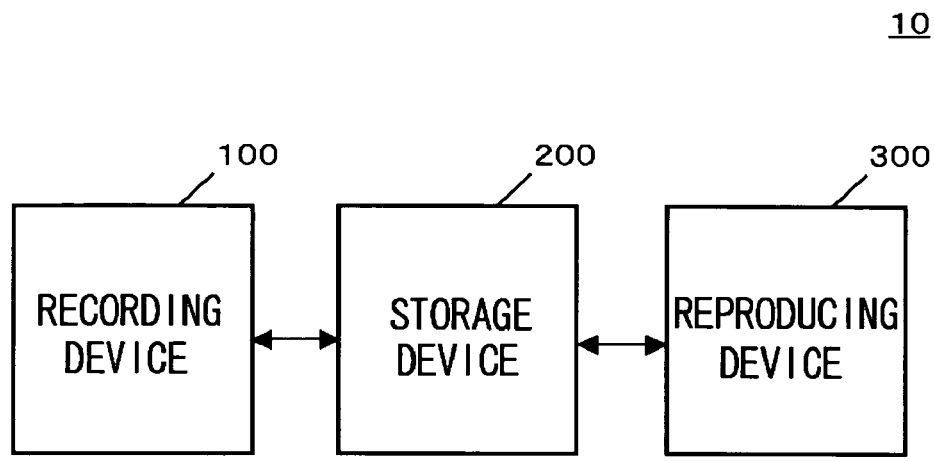
FIG. 1 is a diagram showing the overall configuration of a data management system according to a first embodiment.

FIG. 1 shows the overall configuration of a data management system according to a first embodiment. The data management system 10 comprises: a recording device 100 which controls recording of data onto a storage device 200; a reproducing device 300 which controls reproduction of data recorded on the storage device 200; and the storage device 200 which contains and retains data. The storage device 200 of the present embodiment is a drive-storage combination device. It comprises not only a recording medium for retaining data, but also such components as a controller which controls input/output of data between the recording medium and host devices including the recording device 100 and the reproducing device 300. The present embodiment will be described with a hard disk drive as an example of the storage device 200.

Conventional hard disks have been connected fixedly to a single host device in typical uses. The storage device 200 of the present embodiment is configured detachable from the host devices such as the recording device 100 and the reproducing device 300. That is, the storage device 200 of the present embodiment is a storage device which can be detached and carried from a host device as with CD, DVD, and the like. It can be shared between a plurality of host devices such as the recording device 100, the reproducing device 300, and a recording/reproducing device capable of recording and reproduction.

As above, the storage device 200 of the present embodiment is predicated on the connection with a plurality of host devices. It can thus be connected, for example, to a host device of a third party other than the owner so that the data recorded inside is read. Assume the case of recording contents to be protected by copyright, such as music and pictures, or data to be secured, such as corporate and personal confidential information. Then, it is preferable that the storage device 200 itself have configuration for appropriate data protection with sufficient anti-tampering facilities so that the secret data is prevented from external leak. In view of this, the storage device 200 of the present embodiment is provided with configuration for encrypting secret data and exchanging the same when the secret data is input/output to/from host devices. To store the secret data, a confidential data storing area is also provided aside from normal recording areas. The confidential data storing area is configured so that it is accessible only through a cryptographic engine arranged in the storage device 200. The cryptographic engine outputs the secret data to only the host devices that are authenticated to have right authority. Hereinafter, such a data protection function will be also referred to as "secure function." According to the foregoing configuration and functions, the secret data recorded on the storage device 200 can be protected appropriately.

To maximize the features of the storage device 200 as a removable medium, it is preferable that normal data can also be input/output to/from host devices that do not support the secure function. On that account, the storage device 200 of the present embodiment supports ATA (AT Attachment), an ANSI (American National Standards Institute) standard specification, for the sake of maintaining compatibility with conventional hard disks. The foregoing secure function will thus be implemented as an extension command of ATA. ATA adopts a single task interface. A single command issued occupies the bus until the completion of the command, disabling the issuance of the next command. When the storage device 200 has the configuration for cryptographic communication and the secret data is encrypted for input/output as described above, the processing of encryption, decryption, and the like requires a relatively long time. Commands for inputting/outputting secret data thus require a longer time than commands for inputting/outputting normal data do. Take, for example, the case where secret data is read from the storage device 200. When a read command is issued to the storage device 200, the storage device 200 reads the corresponding secret data from the confidential data storing area by using its own cryptographic engine. The storage device 200 and the host device exchange an encryption key for transmitting the secret data to the host device before the secret data is encrypted with the encryption key and output to the bus. Here, while such processing as encryption and decryption is in operation, the bus keeps being occupied by this command despite of not being used actually.

In the present embodiment, such needless bus occupation is omitted as much as possible so that the bus can be used efficiently for accelerated processing. For this purpose, the series of cryptographic input/output processing for inputting/outputting secret data is divided into a plurality of procedures, and the commands are issued in smaller units. Then, while processing not using the bus, such as encryption and decryption, is in operation, the bus is released as much as possible for issuance of other commands.

Nevertheless, if the cryptographic input/output processing for inputting/outputting secret data is divided into a plurality of procedures, security holes might occur unless the procedures are executed in right order. Thus, in the present embodiment, the cryptographic engine of the storage device 200 manages the order of execution of the procedures while inputting/outputting secret data. If it receives commands in improper order, the cryptographic engine rejects the execution of the commands and returns an error answer.

When a host device such as the recording device 100 and the reproducing device 300 issues a command to the storage device 200 as to the cryptographic input/output processing, and successively issues the next command, the next command is not received if the storage device 200 is executing the previous command. It is ineffective for the host device to keep issuing the next command to the storage device 200 in vain until the command is received. Thus, in the present embodiment, the host device obtains information for estimating the time necessary to execute a command from the storage device 200 in advance, issues the command, and waits the time estimated necessary to execute the command before it issues the next command. This can minimize needless command issuance.

Hereinafter, as an example of input and output of secret data, description will be given of the case where digital contents such as images and music are recorded and reproduced. While the contents themselves may be handled as secret data, the present embodiment encrypts the contents and inputs/outputs the encrypted contents themselves as normal data. Then, data (referred to as license data) necessary to decrypt and use the contents, including a key for decrypting the encrypted contents (referred to as content key), is input/output as secret data by using the foregoing secure function. This makes it possible to maintain sufficient anti-tampering facilities and simplify data input/output while achieving accelerated processing and reduced power consumption. Aside from the content key, the license data includes information as to the use, transfer, and duplication of the license, and a license ID for identifying the license data. Hereinafter, commands for the secure function among those the host devices such as the recording device 100 and the reproducing device 300 issue to the storage device 200 will be sometimes referred to as "secure commands." The rest of the commands will be sometimes referred to as "normal commands."

Figure 2:
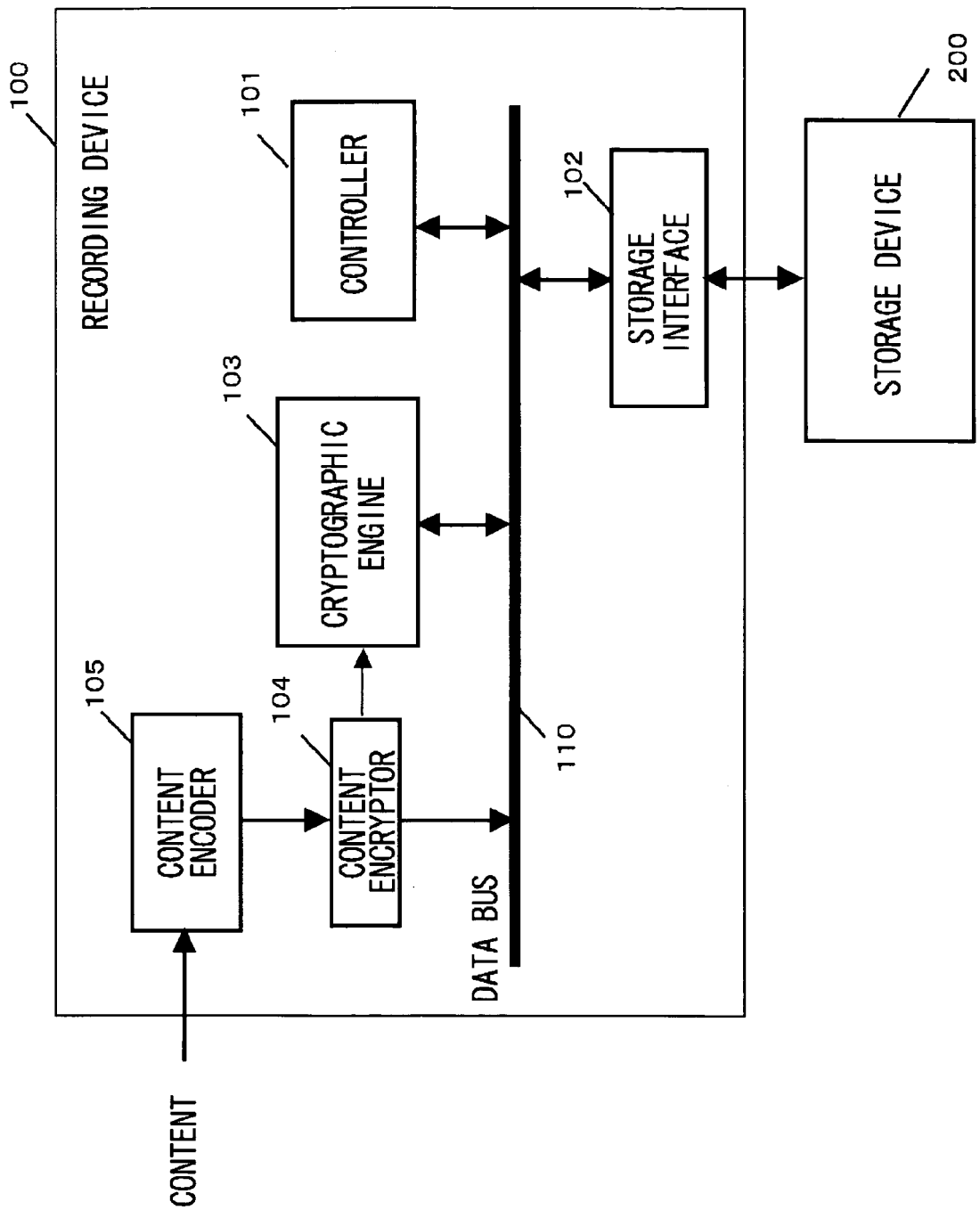
FIG. 2 is a diagram showing the internal configuration of a recording device according to the first embodiment.

FIG. 2 shows the internal configuration of the recording device 100 according to the present embodiment. In terms of hardware, this configuration can be achieved by such components as the CPU and memory of an arbitrary computer, and other LSIs. In terms of software, it can be achieved by a program which is loaded on the memory and has a recording control function. The functional blocks shown here are achieved by the cooperation of these. It will thus be understood by those skilled in the art that these functional blocks may be achieved in various forms including hardware alone, software alone, and combinations thereof. The recording device 100 consists chiefly of a controller 101, a storage interface 102, a cryptographic engine 103, a content encryptor 104, a content encoder 105, and a data bus 110 which connects these components electrically.

The content encoder 105 encodes a content obtained online or offline into predetermined formats. For example, image data obtained over a network may be encoded in a JPEG format. Picture data obtained from broadcasting waves may be encoded in an MPEG format. The content encryptor 104 encrypts the encoded content and issues a content key for decrypting the encrypted content. The encrypted content is recorded on the storage device 200 via the data bus 110 and the storage interface 102. The content key is posted to the cryptographic engine 103, and recorded onto the storage device 200 via the cryptographic engine 103. The cryptographic engine 103 exercises control on the cryptographic communication with the storage device 200 in order to input the license data including the content key to the storage device 200. The storage interface 102 controls input/output of data to/from the storage device 200. The controller 101 exercises centralized control on the components of the recording device 100.

Figure 3:
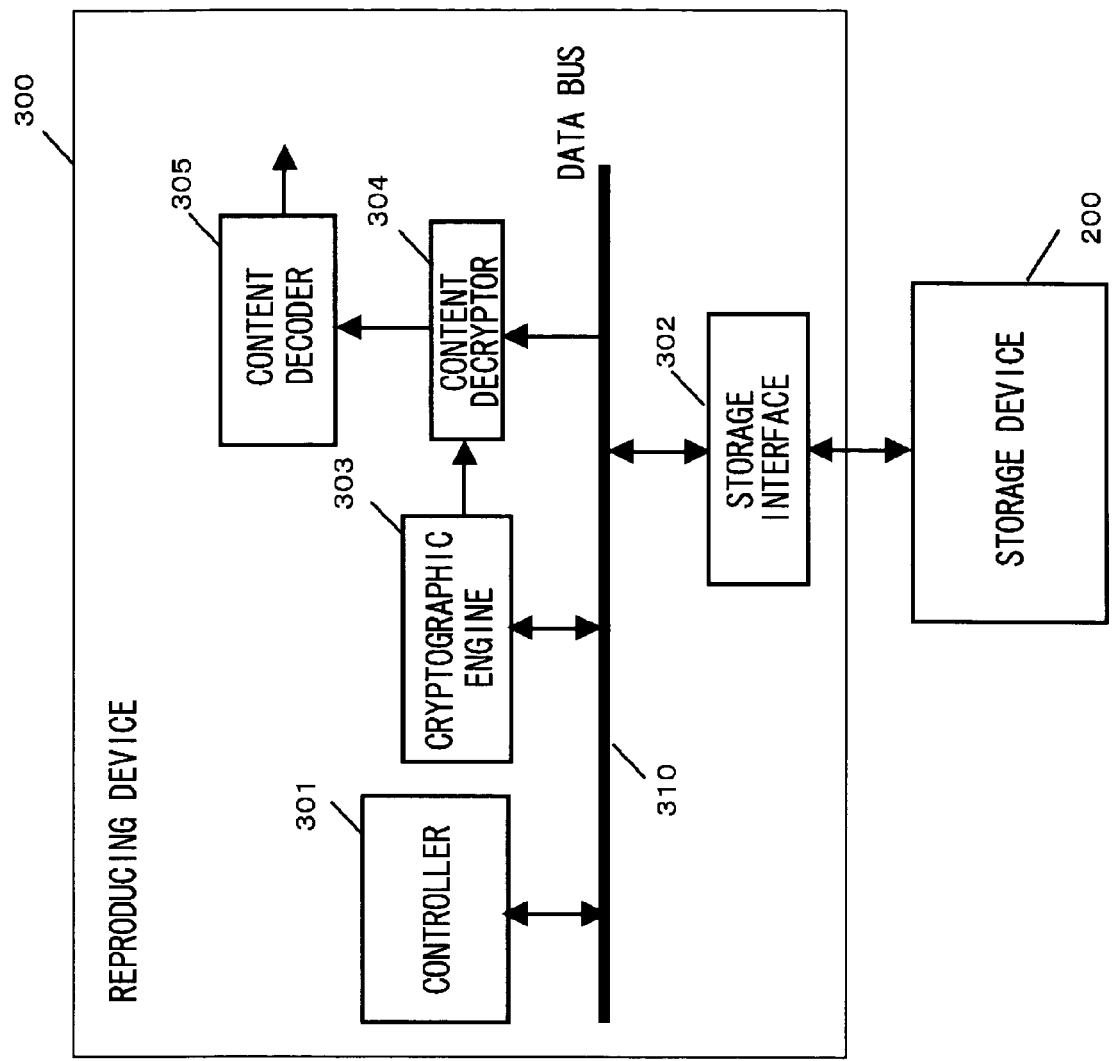
FIG. 3 is a diagram showing the internal configuration of a reproducing device according to the first embodiment.

FIG. 3 shows the internal configuration of the reproducing device 300 according to the present embodiment. Again, these functional blocks can be achieved in various forms such as hardware alone, software alone, and combinations thereof. The reproducing device 300 consists chiefly of a controller 301, a storage interface 302, a cryptographic engine 303, a content decryptor 304, a content decoder 305, and a data bus 310 which connects these components electrically.

The storage interface 302 controls input/output of data to/from the storage device 200. The cryptographic engine 303 exercises control on the cryptographic communication with the storage device 200 in order to receive the license data including the content key from the storage device 200. The content decryptor 304 decrypts the encrypted content read from the storage device 200 with the content key included in the license data obtained from the storage device 200. The content decoder 305 decodes and outputs the content decrypted by the content decryptor 304. For example, image data is output to a not-shown display. Sound data is output to not-shown speakers. The controller 301 exercises centralized control on the components of the reproducing device 300.

Figure 4:
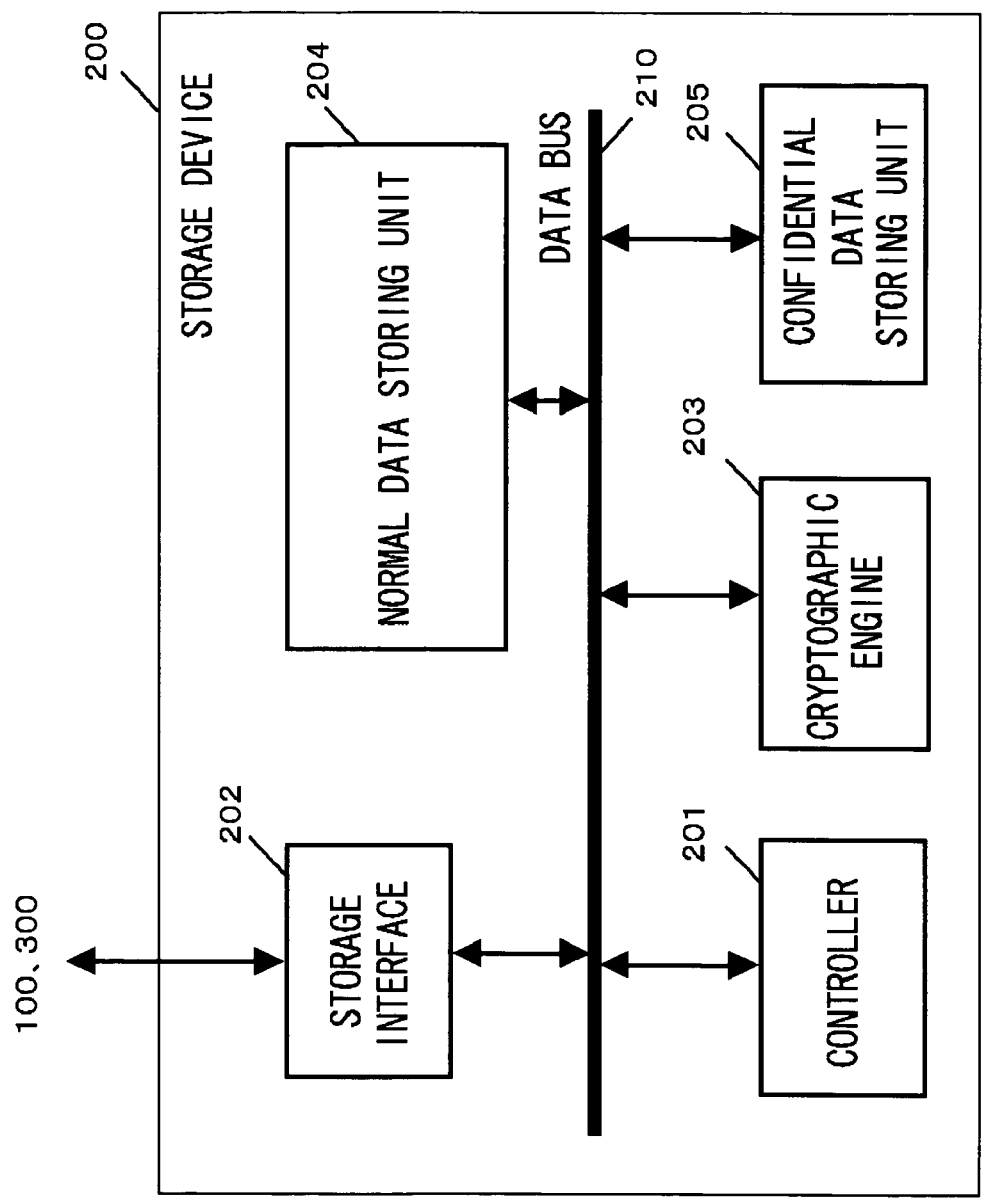
FIG. 4 is a diagram showing the internal configuration of a storage device according to the first embodiment.

FIG. 4 shows the internal configuration of the storage device 200 according to the present embodiment. The storage device 200 consists chiefly of a controller 201, a storage interface 202, a cryptographic engine 203, a normal data storing section 204, a confidential data storing section 205, and a data bus 210 which connects these components electrically.

The storage interface 202 controls input/output of data to/from the recording device 100 and the reproducing device 300. The cryptographic engine 203 exercises control on the cryptographic communication for inputting/outputting secret data such as license data including a content key to/from the recording device 100 and the reproducing device 300. The normal data storing section 204 records encrypted contents, normal data, etc. The confidential data storing section 205 records confidential data such as license data including a content key. The controller 201 exercises centralized control on the components of the storage device 200. The normal data storing section 204 is accessed directly from exterior (for data input/output) while the confidential data storing section 205 is configured accessible (for data input/output) only through the cryptographic engine 203.

Figure 5:
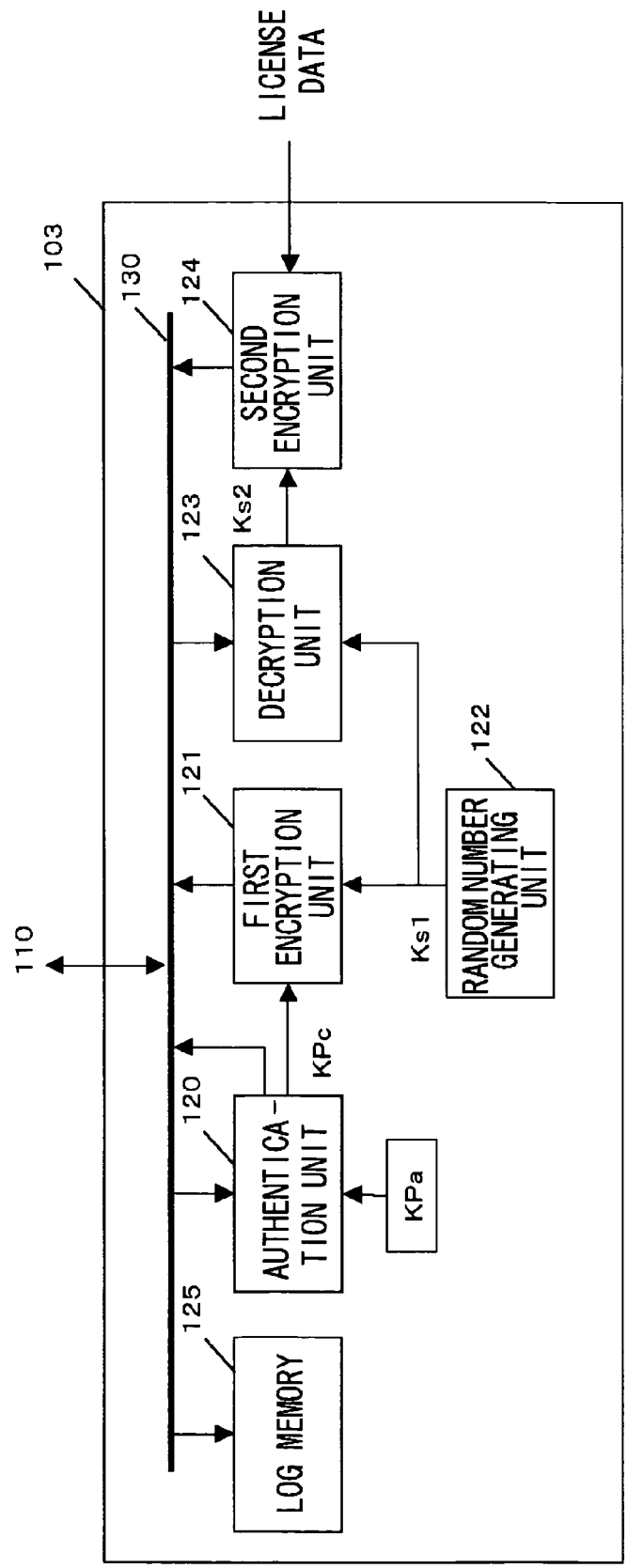
FIG. 5 is a diagram showing the internal configuration of a cryptographic engine of the recording device shown in FIG. 2.

FIG. 5 shows the internal configuration of the cryptographic engine 103 of the recording device 100 shown in FIG. 2. The cryptographic engine 103 comprises an authentication unit 120, a first encryption unit 121, a random number generating unit 122, a decryption unit 123, a second encryption unit 124, a log memory 125, and a local bus 130 which connects at least some of the components electrically.

The authentication unit 120 authenticates a certificate obtained from the storage device 200. The certificate contains plaintext information (referred to as "certificate body") including a public key, and an electronic signature attached to the certificate body. This electronic signature is data obtained by encrypting the result of operation of a hash function on the certificate body (this operation will be referred to as "hash operation") with a root key Kpa of a certificate authority (not shown), a third-party institution. The root key Kpa is a non-public key under strict control by the certificate authority, i.e., a private key of the certificate authority. The authentication unit 120 retains an authentication key KPa which pairs with the root key Kpa. This authentication key KPa is a public key which verifies the authenticity of the certificate. The authenticity of a certificate is verified through comparison between the result of operation of the hash function on the certificate body of the certificate to be verified and the result of decryption of the electronic signature with the authentication key KPa. When the two coincide with each other, the certificate is determined to be authentic. This processing of determining the authenticity of a certificate and approving the authentic certificate is referred to as authentication. When the authentication unit 120 succeeds in authentication, it extracts the public key KPc of the storage device 200 and transmits the same to the first encryption unit 121. If fails, the authentication unit 120 outputs an error notification.

The random number generating unit 122 generates a challenge key Ks1 which is temporarily used to conduct cryptographic communication with the storage device 200. Upon each cryptographic communication, a challenge key Ks1 is generated from a random number. This can minimize the possibility of detection of the challenge key Ks1. The generated challenge key Ks1 is transmitted to the first encryption unit 121 and the decryption unit 123. To post the challenge key Ks1 to the storage device 200, the first encryption unit 121 encrypts the challenge key Ks1 with the public key KPc of the storage device 200 extracted by the authentication unit 120, thereby generating an encrypted symmetric key E(KPc, Ks1). Here, the function E represents encryption, and E(KPc, Ks1) shows that Ks1 is encrypted with KPc.

The decryption unit 123 decrypts the data encrypted with the challenge key Ks1. A session key Ks2 issued by the storage device 200 is encrypted with the challenge key Ks1 when supplied from the storage device 200. The decryption unit 123 thus obtains the challenge key Ks1 generated by the random number generating unit 122 and decrypts the session key Ks2. The decrypted session key Ks2 is transmitted to the second encryption unit 124. The second encryption unit 124 obtains the license data including the content key which the content encryptor 104 has issued in encrypting the content, and encrypts the license data with the session key Ks2 which is issued by the storage device 200. The log memory 125 keeps the transaction log of the series of cryptographic input/output processing.

In FIG. 5, among the components of the cryptographic engine 103, the authentication unit 120, the first encryption unit 121, the decryption unit 123, the second encryption unit 124, and the log memory 125 are electrically connected by the local bus 130. These components are connected to the data bus 110 of the recording device 100 through the local bus 130. The connection of each component may be modified in various ways, whereas the present embodiment is designed so that the random number generating unit 122 for generating a challenge key is not connected with the data bus 110 directly. This can prevent the keys used inside the cryptographic engine 103 from leaking outside through the other components of the recording device 100 etc, thus achieving improved security.

Figure 6:
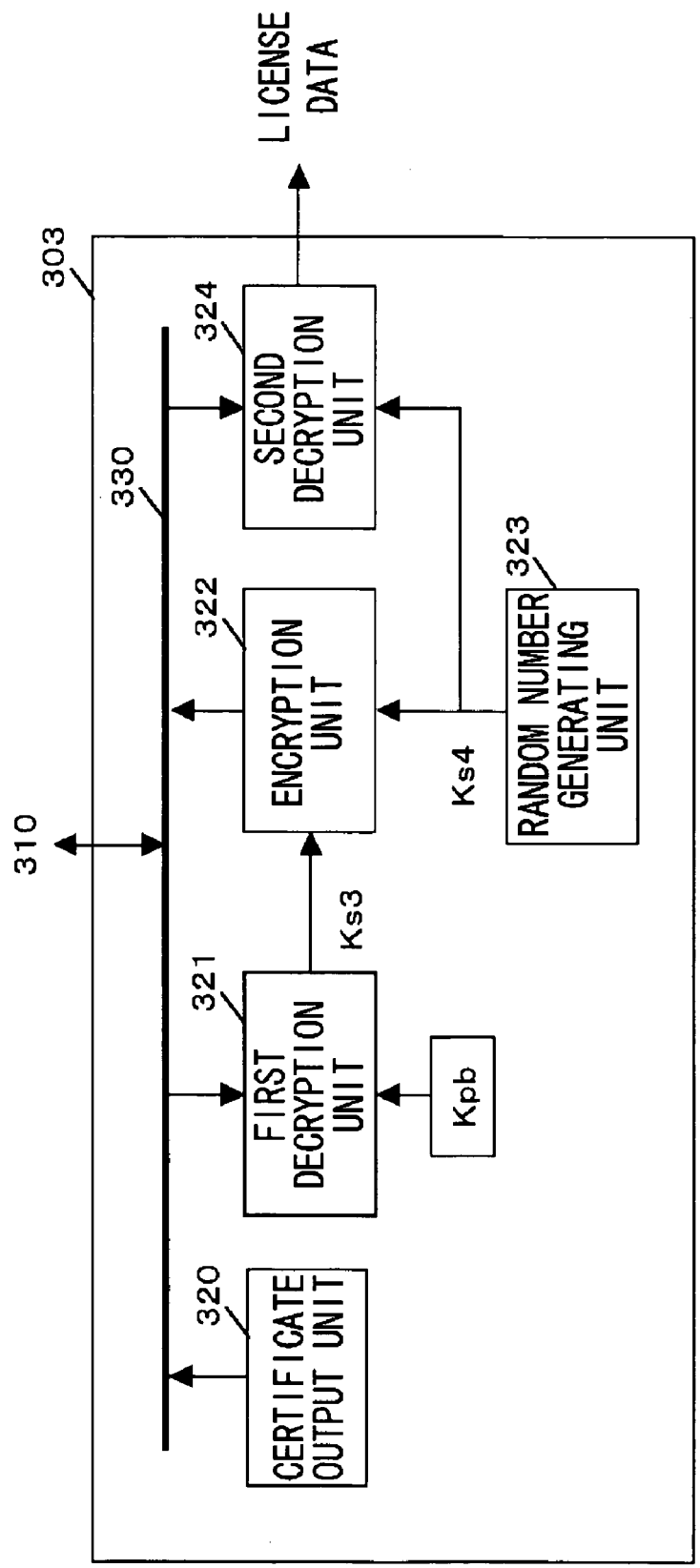
FIG. 6 is a diagram showing the internal configuration of a cryptographic engine of the reproducing device shown in FIG. 3.

FIG. 6 shows the internal configuration of the cryptographic engine 303 of the reproducing device 300 shown in FIG. 3. The cryptographic engine 303 comprises a certificate output unit 320, a first decryption unit 321, an encryption unit 322, a random number generating unit 323, a second decryption unit 324, and a local bus 330 which connects at least some of the components electrically.

The certificate output unit 320 outputs the certificate of the reproducing device 300. The certificate may be retained in the certificate output unit 320, or retained in and read from a not-shown certificate retaining unit. The certificate consists of a certificate boy including the public key KPb of the reproducing device 300, and an electronic signature attached to the certificate body. As with the certificate of the storage device 200, the electronic signature is encrypted with the root key Kpa of the certificate authority. The first decryption unit 321 decrypts data encrypted with the public key KPb by using a private key Kpb. A challenge key Ks3 issued by the storage device 200 is encrypted with the public key KPb of the reproducing device 300 when supplied from the storage device 200. The first decryption unit 321 thus extracts the challenge key Ks3 through decryption using its own private key Kpb. The extracted challenge key Ks3 is transmitted to the encryption unit 322. The random number generating unit 323 generates a session key Ks4 which is temporarily used to conduct cryptographic communication with the storage device 200. The generated session key Ks4 is transmitted to the encryption unit 322 and the second decryption unit 324.

To post the session key Ks4 to the storage device 200, the encryption unit 322 encrypts the session key Ks4 with the challenge key Ks3 which is extracted by the decryption unit 321. The second decryption unit 324 decrypts data encrypted with the session key Ks4. The license data is encrypted with the session key Ks4 when supplied from the storage device 200. The second decryption unit 324 extracts the license data through decryption using the session key Ks4 which is generated by the random number generating unit 323. The extracted license data is transmitted to the content decryptor 304. The content decryptor 304 decrypts the encrypted content by using the content key included in this license data.

Again, in the cryptographic engine 303 shown in FIG. 6, the connection of each component may be modified in various ways. The present embodiment is designed so that the random number generating unit 323 for generating a challenge key is not connected with the data bus 310 directly. This prevents the encrypted keys used inside the cryptographic engine 303 from leaking outside.

Figure 7:
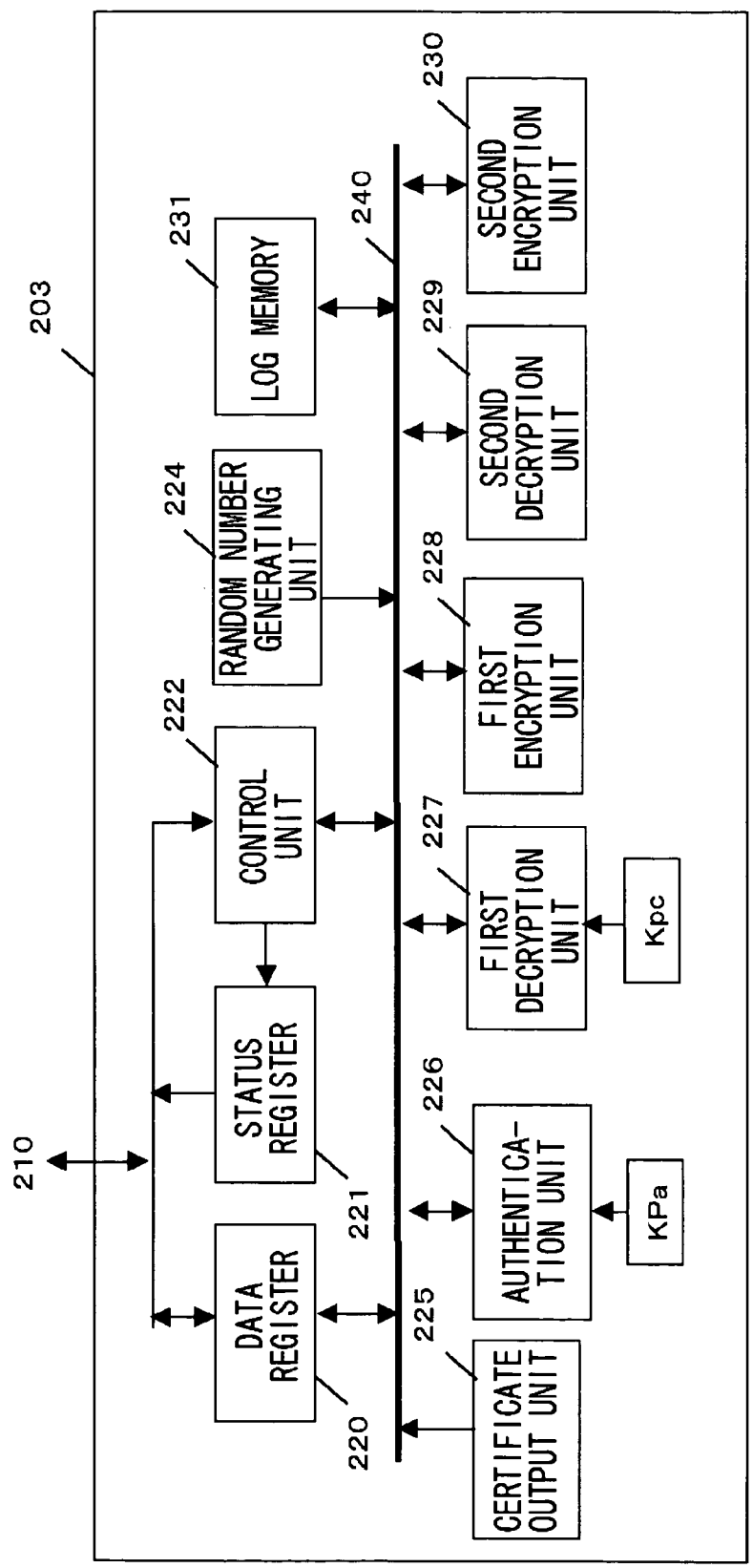
FIG. 7 is a diagram showing the internal configuration of a cryptographic engine of the storage device shown in FIG. 4.

FIG. 7 shows the internal configuration of the cryptographic engine 203 of the storage device 200 shown in FIG. 4. These functional blocks can also be achieved in various forms including hardware alone, software alone, and combinations thereof. The cryptographic engine 203 comprises a data register 220, a status register 221, a control unit 222, a random number generating unit 224, a certificate output unit 225, an authentication unit 226, a first decryption unit 227, a first encryption unit 228, a second decryption unit 229, a second encryption unit 230, a log memory 231, and a local bus 240 which connects at least some of the components electrically.

The data register 220 is a register for inputting/outputting data. It mediates the input/output of data with configuration outside the cryptographic engine 203. The status register 221 retains an executive instruction by which the controller 201 instructs the cryptographic engine 203 to execute a secure command received from the recording device 100 or the reproducing device 300, and status information by which the cryptographic engine 203 posts the status of processing or the result of processing of the secure command to the controller 201.

When the controller 201 of the storage device 200 receives a secure command from the controller of the recording device 100 or the reproducing device 300, it stores the executive instruction (start instruction) of the command into the status register 221. For example, individual secure commands are numbered in the order of execution, and the controller 201 stores the numbers of the received secure commands into the state resister 211, thereby instructing the cryptographic engine 203 to execute the commands. When the status register 221 stores a new executive instruction, the control unit 222 starts processing the same.

The control unit 222 stores the status of processing and the result of processing of the command posted from the controller 201 into the status register 221. For example, the status of processing can be expressed in two statuses, "Busy" which represents the state where the processing is in operation and "Ready" which represents the state where the processing is not in operation. The result of processing can be expressed in two statuses, "Normal" which indicates that the processing is completed normally and "Error" which indicates that the processing is aborted. When the cryptographic engine 203 starts executing a secure command, the control unit 222 changes the status of processing of the status register 221 to "Busy." When the execution of the secure command is completed, the control unit 222 changes the status of processing of the status register 221 to "Ready" and reflects the reason of termination of the command onto the result of processing.

The random number generating unit 224 generates the session key Ks2 or the challenge key Ks3 which is temporarily used for cryptographic communication with the recording device 100 and the reproducing device 300. Here, the random number generating unit 224 performs a random number operation. The log memory 231 keeps the transaction log of the series of cryptographic input/output processing.

The certificate output unit 225 outputs the certificate of the storage device 200. The certificate may be retained in the certificate output unit 225, or retained in and read from a predetermined storing area of the storage device 200 such as the confidential data storing section 205. The certificate consists of a certificate boy including the public key KPc of the storage device 200, and an electronic signature attached to the certificate body. The electronic signature is encrypted with the root key Kpa of the certificate authority. The authentication unit 226 authenticates a certificate obtained from the reproducing device 300. The authentication unit 226 verifies the authenticity of a certificate provided from exterior by using the authentication key KPa. When the authentication unit 226 succeeds in authentication, it extracts the public key KPb of the reproducing device 300 included in the certificate, and stores the same into the data register 220. If the authentication unit 226 fails in authentication, it outputs an error notification to the control unit 222. In authenticating a certificate, the authentication unit 226 performs a decrypting operation for decrypting data encrypted with a public key of public-key cryptography, and a hash operation on the certificate body.

The first decryption unit 227 performs a decrypting operation for decrypting data encrypted with a public key of public-key cryptography. Specifically, it decrypts the data encrypted with its own public key KPc by using its own private key KPc. The first encryption unit 228 performs an encrypting operation for encrypting data with a public key of public-key cryptography. Specifically, it encrypts the challenge key Ks3 issued by the random number generating unit 224 with the public key KPb of the reproducing unit 300 which is received from the reproducing unit 300. The second decryption unit 229 performs a decrypting operation for decrypting data encrypted with a key of symmetric-key cryptography. Specifically, it decrypts data encrypted with the session key Ks2 and the challenge key Ks3 issued by the random number generating unit 224, by using the session key Ks2 and the challenge key Ks3, respectively. The second encryption unit 230 performs an encrypting operation for encrypting data with a key of symmetric-key cryptography. Specifically, it encrypts the session key Ks2 issued by the random number generating unit 224 and the license data, by using the challenge key Ks1 issued from the recording device 100 and the session key Ks4 issued from the reproducing device 300, respectively.

Figure 8:
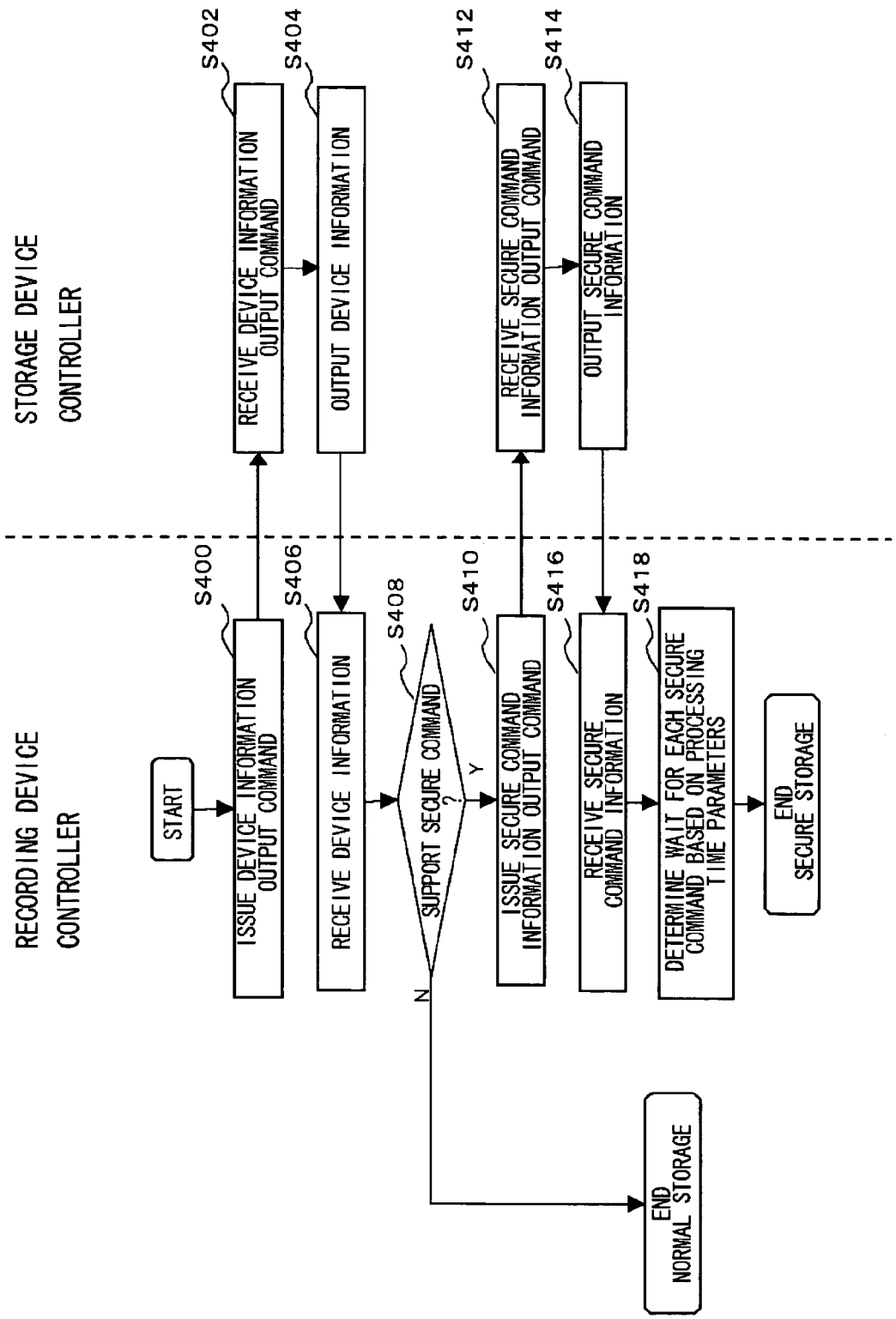
FIG. 8 is a diagram showing the procedure by which a host device obtains information for estimating time necessary for the storage device to execute a command from the storage device.

FIG. 8 shows an initial procedure by which the host devices obtains, from the storage device, information indicating whether or not the storage device supports a secure command set and, if secure commands are supported, information for estimating the time necessary to execute the secure commands. When the storage device 200 is connected with the recording device 100, the controller 101 of the recording device 100 issues a device information output command to the storage device 200 (S400). The controller 201 of the storage device 200 receives the device information output command from the controller 101 of the recording device 100 (S402), and outputs device information (S404). For example, the device information to be posted includes the type of the hard disk, the recording capacity of normal data, interface conditions, and supported command sets. When the controller 101 receives the device information of the storage device 200 (S406), it determines whether or not the storage device 200 supports the secure command set (S408). If not (N at S408), the storage device 200 is handled as a hard disk supporting no secure command.

If the storage device 200 supports the secure commands (Y at S408), the controller 101 then issues a secure information output command (S410). The controller 201 receives the secure information output command (S412), and outputs secure information (S414). The secure information to be posted is information for estimating the time necessary to execute secure commands when the storage device 200 receives the commands. The information includes typical times required for individual basic processes for use in executing the secure commands, such as an encrypting operation of public-key cryptography, an encrypting operation of symmetric-key cryptography, a decrypting operation of public-key cryptography, a decrypting operation of symmetric-key cryptography, a hash operation, a random number generating operation, and log retrieval. A typical time refers to a processing time excluding exceptions, such that ninety nine out of a hundred identical secure commands issued complete within that time. When the controller 101 receives the secure information of the storage device 200 (S416), it determines a wait when each secure command is issued, based on the information received (S418).

For the information for estimating the time necessary to execute a command, an average processing time or the maximum processing time may be output instead of the typical processing time required for each basic process. These times may be output in combination. In any case, the controller 101 obtains the processing times necessary for the basic processes output by the storage device 200, and estimates the time necessary for each secure command on the basis of the basic processes to be performed for each secure command. Moreover, typical processing times, average processing times, or the maximum processing times necessary to execute the respective secure commands may be output instead of the processing times necessary for the basic processes. These times may be output in combination. In any case, the controller 101 estimates the wait between the issuance of each secure command and that of the next secure command from the information for estimation output by the storage device 200. While FIG. 8 has dealt with the case where the recording device 100 functions as the host device, the same holds true for the case where the reproducing device 300 functions as the host device.

Figure 9:
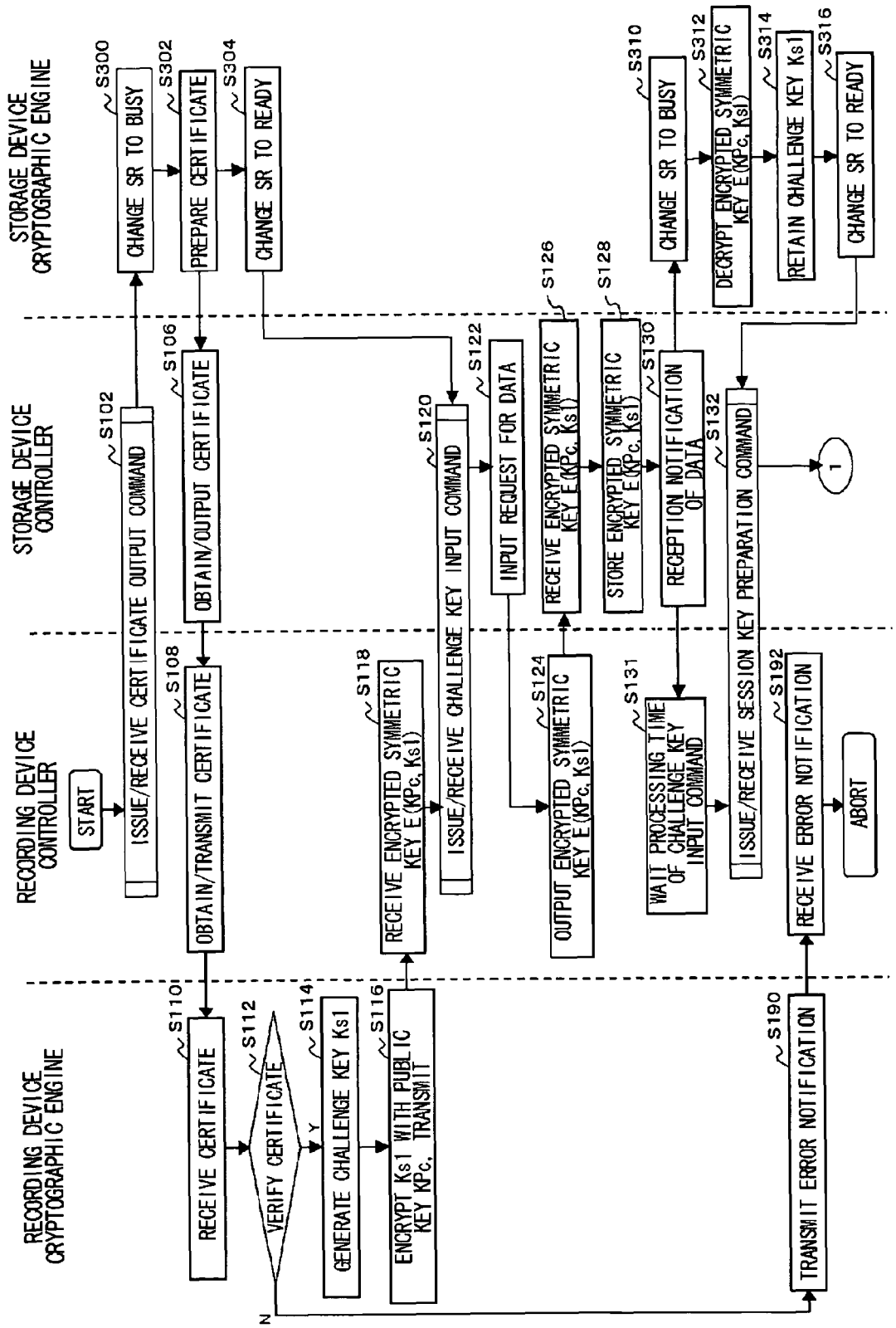
FIG. 9 is a diagram showing the procedure up to the point where the recording device records license data onto the storage device.
Figure 10:
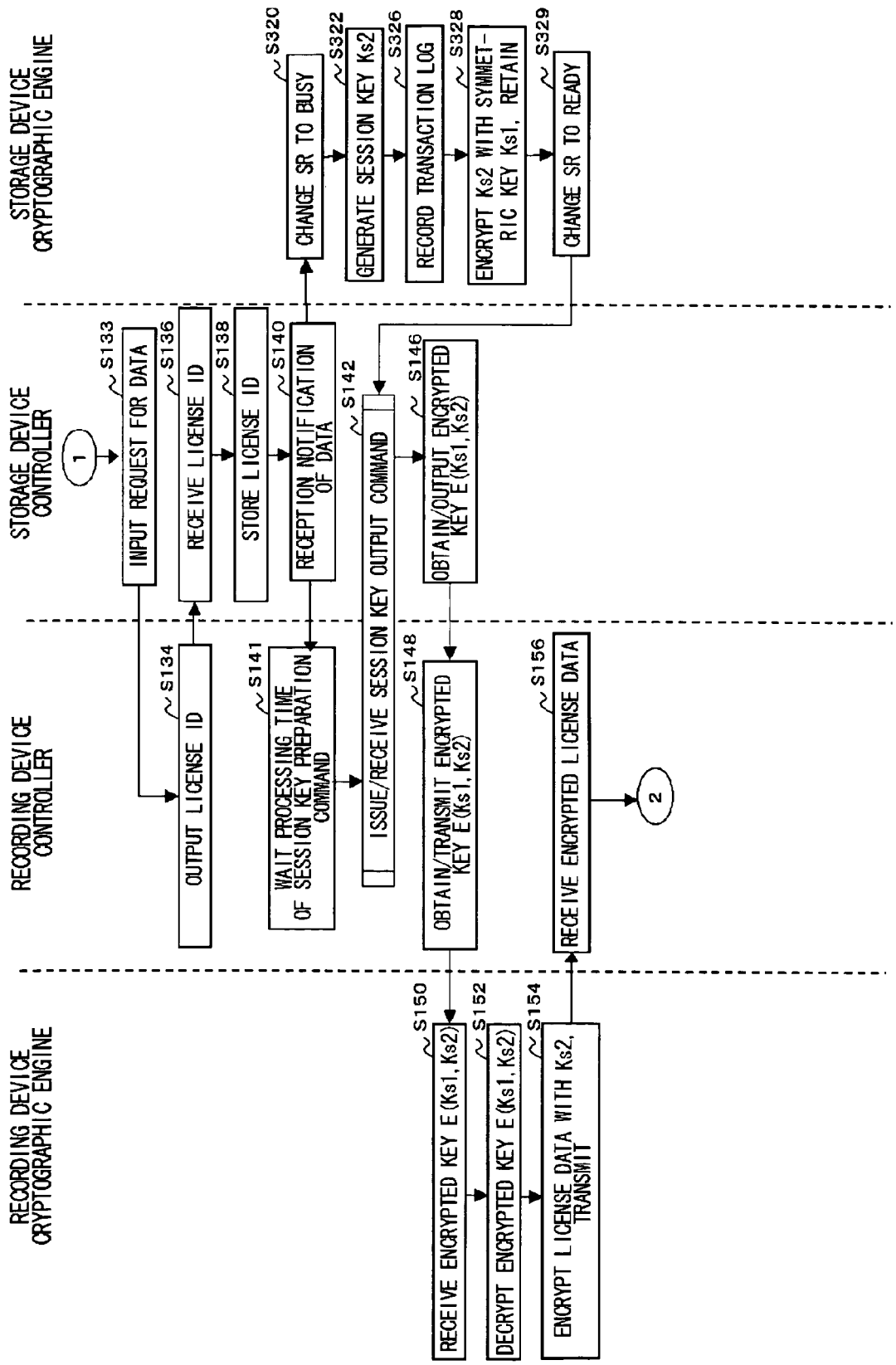
FIG. 10 is a diagram showing the procedure up to the point where the recording device records license data onto the storage device.
Figure 11:
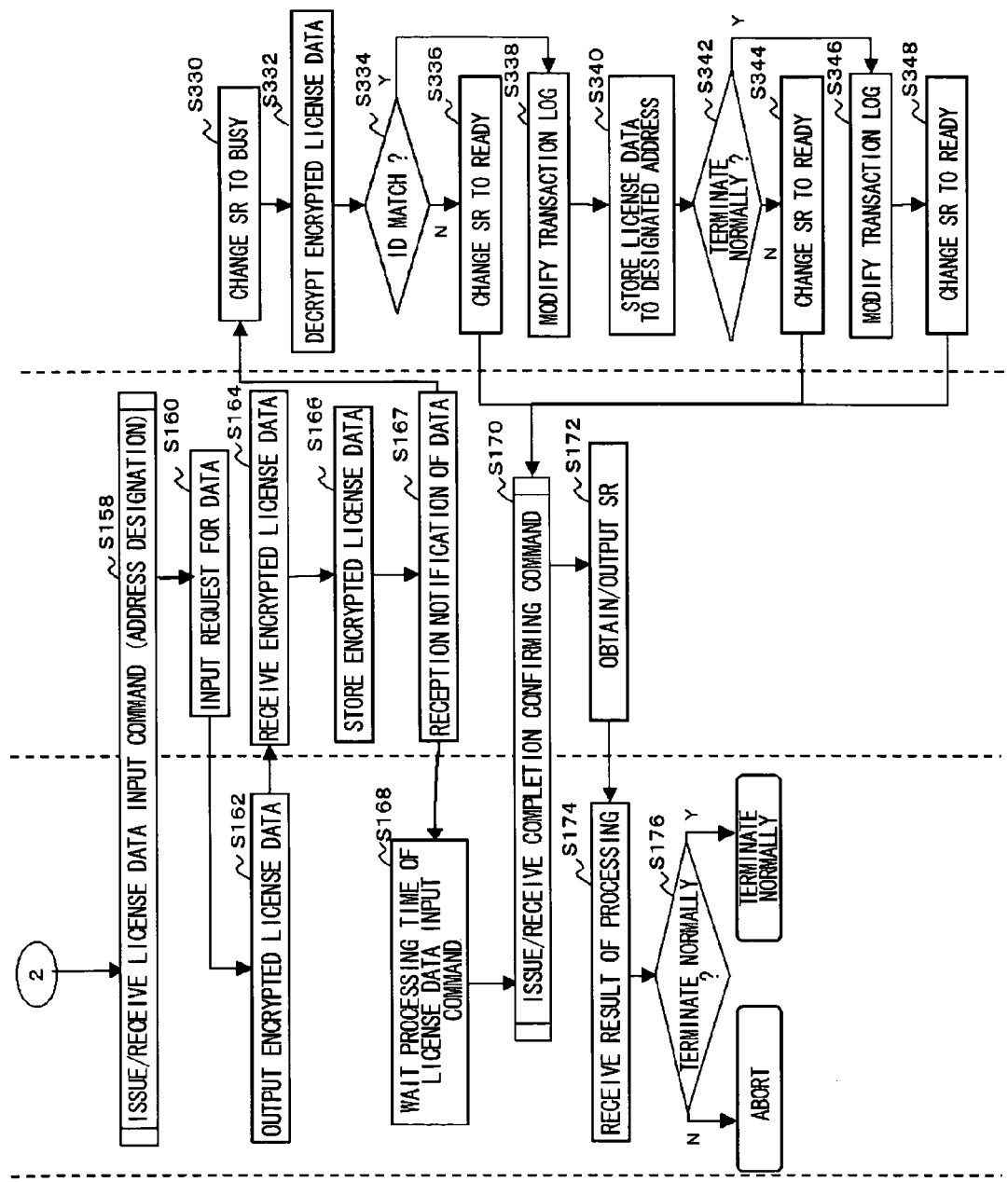
FIG. 11 is a diagram showing the procedure up to the point where the recording device records license data onto the storage device.

FIGS. 9, 10, and 11 show the procedure up to the point where the recording device 100 records license data onto the storage device 200. Initially, the controller 101 of the recording device 100 issues a certificate output command to the storage device 200 (S102). When the controller 201 receives the certificate output command normally, it instructs the cryptographic engine 203 to output its certificate. The issuance and reception of a secure command will be detailed in FIG. 16. The control unit 222 changes the status of processing of the status register 221 to "Busy" (S300). The certificate output unit 225 stores the certificate into the data register 220 (S302). After the completion of the processing, the control unit 222 changes the status of processing of the status register 221 to "Ready" and the result of processing to "Normal" (S304). The controller 201 reads the certificate from the data register 220 and outputs it to the recording device 100 (S106).

The controller 110 obtains the certificate from the storage device 200, and transmits it to the cryptographic engine 103 of the recording device 100 (S108). When the cryptographic engine 103 receives the certificate of the storage device 200 (S110), the authentication unit 120 authenticates the certificate with the authentication key KPa (S112). If authenticity is not approved of the certificate (N at S112), the authentication unit 120 transmits an error notification to the controller 101 (S190). The controller 101 receives the error notification (S192), and aborts the processing. If the certificate is authenticated (Y at S112), the cryptographic engine 103 generates a challenge key Ks1 by using the random number generating unit 122 (S114). The cryptographic engine 103 encrypts the generated challenge key Ks1 with the public key KPc of the storage device 200 to create an encrypted symmetric key E(KPc,Ks1) by using the encryption unit 121, and transmits the same to the controller 101 (S116).

When the controller 101 receives the encrypted symmetric key E(KPc,Ks1) (S118), it issues a challenge key input command to the storage device 200 (S120). When the controller 201 receives the challenge key input command normally, it outputs an input request for the encrypted symmetric key E(KPc,Ks1) to the recording device 100 (S122). In response to this input request, the controller 101 outputs the encrypted symmetric key E(KPc,Ks1) to the storage device 200 (S124). The controller 201 receives the encrypted symmetric key E(KPc,Ks1) (S126), stores it into the data register 220 (S128), and returns a reception notification to the controller 101 (S130). The controller 201 then instructs the cryptographic engine 203 to receive the challenge key.

The control unit 222 changes the status of processing of the status register 221 to "Busy" (S310), fetches the encrypted symmetric key E(KPc,Ks1) from the data register 220, and supplies it to the first decryption unit 227. The first decryption unit 227 decrypts the supplied encrypted symmetric key E(KPc,Ks1) with the private key Kpc of the storage device 200, thereby extracting the challenge key Ks1 (S312). The first decryption unit 227 outputs the challenge key Ks1 to the control unit 222 (S314). When the control unit 222 obtains the challenge key Ks1, it changes the status of processing of the status register 221 to "Ready" and the result of processing to "Normal" (S316).

Meanwhile, the controller 101 completes the input of the encrypted symmetric key E(KPc,Ks1), and waits the time estimated necessary for the storage device 200 to execute the challenge key input command (S131). The processing to be performed for the challenge key input command includes decrypting the encrypted symmetric key E(KPc,Ks1) to extract the symmetric key Ks1 and retaining the same. Thus, the controller 101 must wait just as long as necessary for the decryption processing of public-key cryptography. In the meantime, it is possible to issue normal commands. The controller 101 thus issues normal commands if necessary. After a lapse of the time estimated necessary to execute the challenge key input command, the controller 101 issues a session key preparation command to the storage device 200 (S132). As will be described later, the controller 201 does not receive the session key preparation command until the execution of the challenge key input command is completed. If the execution of the command is completed, the controller 201 receives the session key preparation command.

When the controller 201 receives the session key preparation command normally, it outputs an input request for a license ID to the recording device 100 (S133). This license ID is the ID of the license data to be written to the storage device 200 by the series of cryptographic input/output processing shown in FIGS. 9 to 11. It is used to keep a transaction log and confirm the input license data. In response to this input request, the controller 101 outputs the license ID to the storage device 200 (S134). The controller 201 receives the license ID (S136), stores it into the data register 220 (S138), and returns a reception notification to the controller 101 (S140).

The control unit 222 changes the status of processing of the status register 221 to "Busy" (S320). The random number generating unit 224 generates a session key Ks2 and outputs it to the control unit 222 (S322). Then, the control unit 222 stores the license ID and the generated session key Ks2 as the transaction log, and RP (Receive Prepare) as the status information, into the log memory 231 (S326). The control unit 222 supplies the session key Ks2 and the challenge key Ks1 to the second encryption unit 230. The second encryption unit 230 encrypts the challenge key Ks1 with the session key Ks2 to create an encrypted key E(Ks1,Ks2), and stores it into the data register 220 (S328). After the completion of the processing, the control unit 222 changes the status of processing of the status register 221 to "Ready" and the result of processing to "Normal" (S329).

Meanwhile, the controller 101 receives the reception notification of the session key preparation command, and waits the time estimated necessary for the storage device 200 to execute the session key preparation command (S141). The processing to be performed for the session key preparation command includes generating the session key Ks2 and encrypting Ks2 with Ks1. Thus, the controller 101 must wait just as long as necessary for the processing of random number generation and the cryptographic processing of symmetric-key cryptography. After a lapse of the time estimated necessary to execute the session key preparation command, the controller 101 issues a session key output command to the storage device 200. The controller 201 receives the session key output command (S142). As will be described later, the session key output command is not received unless the execution of the session key preparation command is completed. If the execution of the command is completed, the session key output command is received. When the command is received, the controller 201 reads the encrypted key E(Ks1,Ks2) from the data register 220 and outputs it to the controller 101 (S146).

The controller 101 receives the encrypted key E(Ks1,Ks2) from the storage device 200, and transmits it to the cryptographic engine 103 (S148). When the cryptographic engine 103 receives the encrypted key E(Ks1,Ks2) from the controller 101 (S150), the decryption unit 123 decrypts the encrypted key E(Ks1,Ks2) with the challenge key Ks1, thereby extracting the session key Ks2 (S152). Subsequently, by using the second encryption unit 124, the cryptographic engine 103 encrypts the license data including the content key of the content issued by the content encryptor 104 and the license ID with the session key Ks2 issued by the storage device 200, thereby creating encrypted license data. The cryptographic engine 103 transmits the encrypted license data to the controller 101 (S154).

When the controller 101 receives the encrypted license data (S156), it issues a license data input command to the storage device 200 (S158). The license data input command includes designation of the address at which the license data is written to the storage device 200. When the controller 201 receives the license data input command normally, the controller 201 outputs an input request for the encrypted license data to the recording device 100 (S160). In response to this Input Request for Data, the controller 101 outputs the encrypted license data to the storage device 200 (S162). The controller 201 receives the encrypted license data (S164), and stores it into the data register 220 (S166).

Then, the controller 201 outputs the reception notification of the data to the recording device 100, and instructs the cryptographic engine 203 to receive the license data at the same time (S167).

The control unit 222 changes the status of processing of the status register 221 to "Busy" (S330), obtains the encrypted license data from the data register 220, and supplies it to the second decryption unit 229 along with the session key Ks2. The second decryption unit 229 decrypts the encrypted license data with the session key Ks2 to extract the license data, and provides the extracted license data to the control unit 222 (S332). When the control unit 222 receives the license data, it compares the license ID included in the license data with the license ID in the transaction log (S334). If the two license IDs are different (N at S334), the control unit 222 changes the status of processing of the status register 221 to "Ready" and changes the result of processing to "Error" (S336).

If the two license IDs coincide with each other (Y at S334), the control unit 222 records the designated address into the transaction log, and changes the status information in the transaction log from RP to RL (Receive License) (S338). Then, the control unit 222 performs storing processing for storing the license data to the designated address of the confidential data storing section 205 (S340). The control unit 222 checks whether or not the storing processing is terminated normally, since the license data might be destroyed if the storing of the data is aborted for any reason (S342). If the storing processing is terminated without the data being recorded (N at S342), the control unit 222 changes the status of processing of the status register 221 to "Ready" and the result of processing to "Error" (S344). If the data is stored normally (Y at S342), the control unit 222 changes the status information in the transaction log of the log memory 231 from RL to RC (Receive Completed) (S346). When the modification of the transaction log is completed, the control unit 222 changes the status of processing of the status register 221 to "Ready" and the result of processing to "Normal" (S348).

Meanwhile, the controller 101 receives the reception notification of the data, and waits the time estimated necessary for the storage device 200 to execute the license data input command (S168). The processing to be performed for the license data input command includes decrypting the encrypted license data with the session key Ks2 and recording the input license data onto the confidential data storing section 205. Thus, the controller 101 has only to wait as long as the sum of the time required for the decryption processing of symmetric-key cryptography and the time required for recording. After a lapse of the time estimated necessary to execute the license data input command, the controller 101 issues a completion confirmation command to the storage device 200 in order to confirm if the license data is stored. If the execution of the license data input command is completed, the controller 201 receives the completion confirmation command (S170). The controller 222 refers to the result of processing of the status register 221, and returns the result of processing of the previous command, i.e., the license data input command to the controller 101 (S172). The controller 101 receives the result of processing of the license data input command from the controller 201 (S174), and consults the result of processing received to check whether or not the license data input command is completed normally (S176). If the license data is stored into the storage device 200 (Y at S176), the controller 101 terminates the processing normally. On the other hand, if the storing fails (N at S176), the controller 101 aborts the processing. Here, the controller 101 tries to record the license data again.

Through the procedure described above, the license data for decrypting the content is recorded onto the storage device 200. The encrypted content is normal data and thus is directly written to the storage device 200 by a normal command. Description thereof will thus be omitted here.

Figure 12:
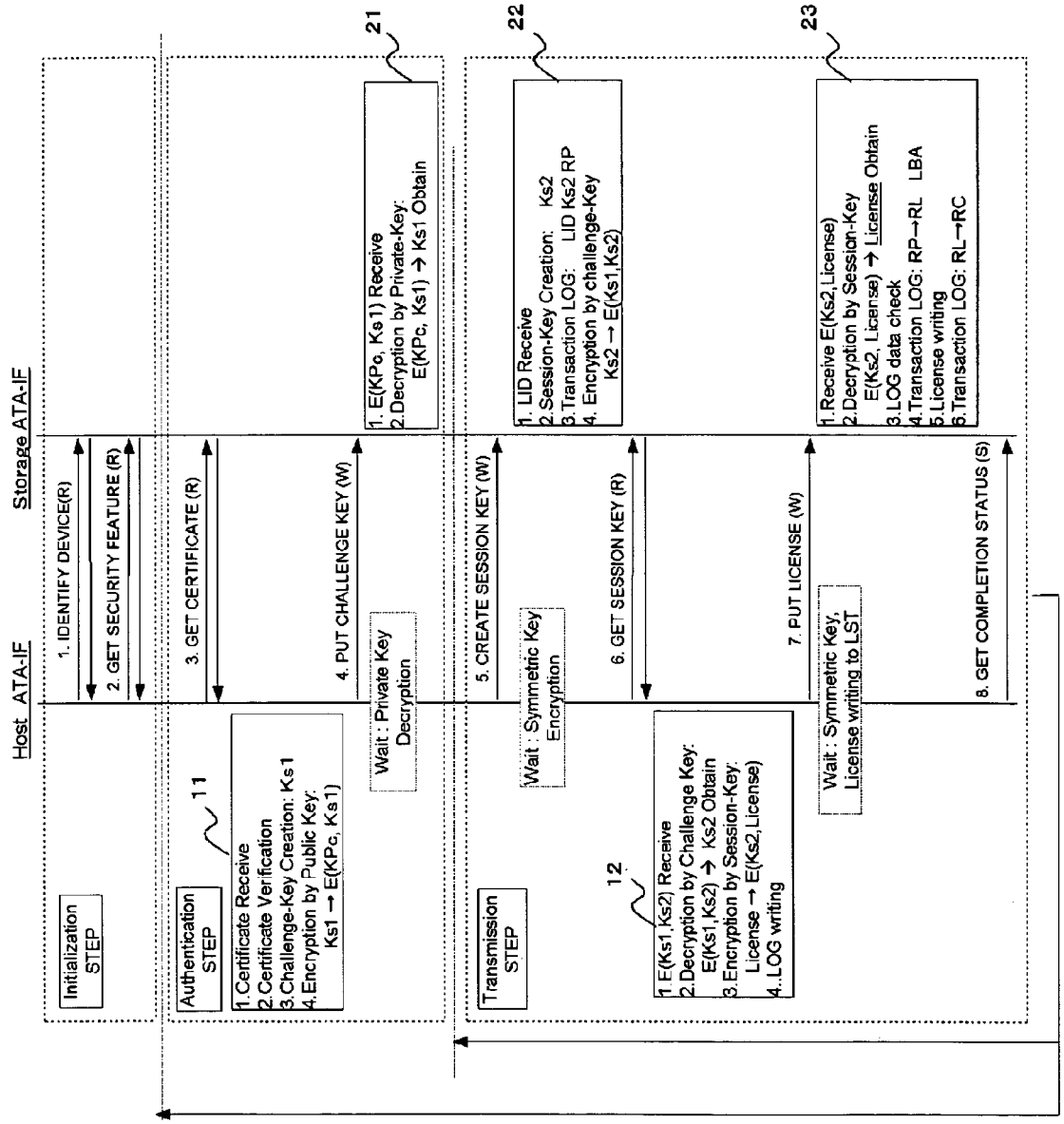
FIG. 12 is a diagram showing the procedures on ATA interfaces up to the point where the recording device records license data onto the storage device.

FIG. 12 is a sequence diagram showing a series of procedures on ATA interfaces from power-on to the point where the license data is stored into the storage device 200. The shown example is for situations where the initial procedure shown in FIG. 8 and the procedure shown in FIGS. 9 to 11, in which the recording device 100 records the license data onto the storage device 200, are processed normally.

The "Host ATA-IF" corresponds to the storage interface 102 of the recording device 100, and the "Storage ATA-IF" the storage interface 202 of the storage device 200. The midsection between the two ATA-IFs shows secure commands. The command names are followed by (W), (R), and (S), which indicate the properties of the commands. (W) represents a command which includes inputting a data string, i.e., after the reception of which the storage device 200 issues a data request. (R) represents, on the other hand, a command which includes outputting a data string. (S) represents a command which includes neither of inputting and outputting a data string.

The commands "IDENTIFY_DEVICE," "GET_SECURITY_FEATURE," "GET_CERTIFICATE," "PUT_CALLENGE_KEY," "CREATE_SESSION_KEY," "GET_SESSION_KEY," "PUT_LICENSE," and "GET_COMPLETION_STATUS" correspond to the device information output command, the secure information output command, the certificate output command, the challenge key input command, the session key preparation command, the challenge key output command, the license data input command, and the completion confirmation command, respectively. Moreover, the reference numeral 11 corresponds to the processing of S110, S112, S114, and S116. The reference numeral 12 corresponds to the processing of S150, S152, and S154, and the log recording processing of the recording device 100. The reference numeral 21 corresponds to the processing of S128 and S312, the reference numeral 22 the processing of S138, S322, S326, and S328, and the reference numeral 23 the processing of S172, S332, S334, S338, S340, and S346. The details of the internal processing are not shown in FIG. 12.

This sequence is sectioned into "Initialization STEP (initial step)" by which information on the storage device 200 is obtained, "Authentication STEP" up to the acquisition of the challenge key Ks1 by the storage device 200, and "Transmission STEP" up to the transmission and writing of the license. The arrow returning from the end to the top of "Transmission STEP" shows that "Initialization STEP" and "Authentication STEP" may be shared between pieces of license data that are stored into the storage device 200 successively.

The omission of "Initialization STEP" and "Authentication STEP" yields no drop in the security of the license data. Moreover, the arrow returning from the end of the "Transmission STEP" to the top of the "Authentication STEP" shows that "Initialization STEP" may be shared among all procedures.

Figure 13:
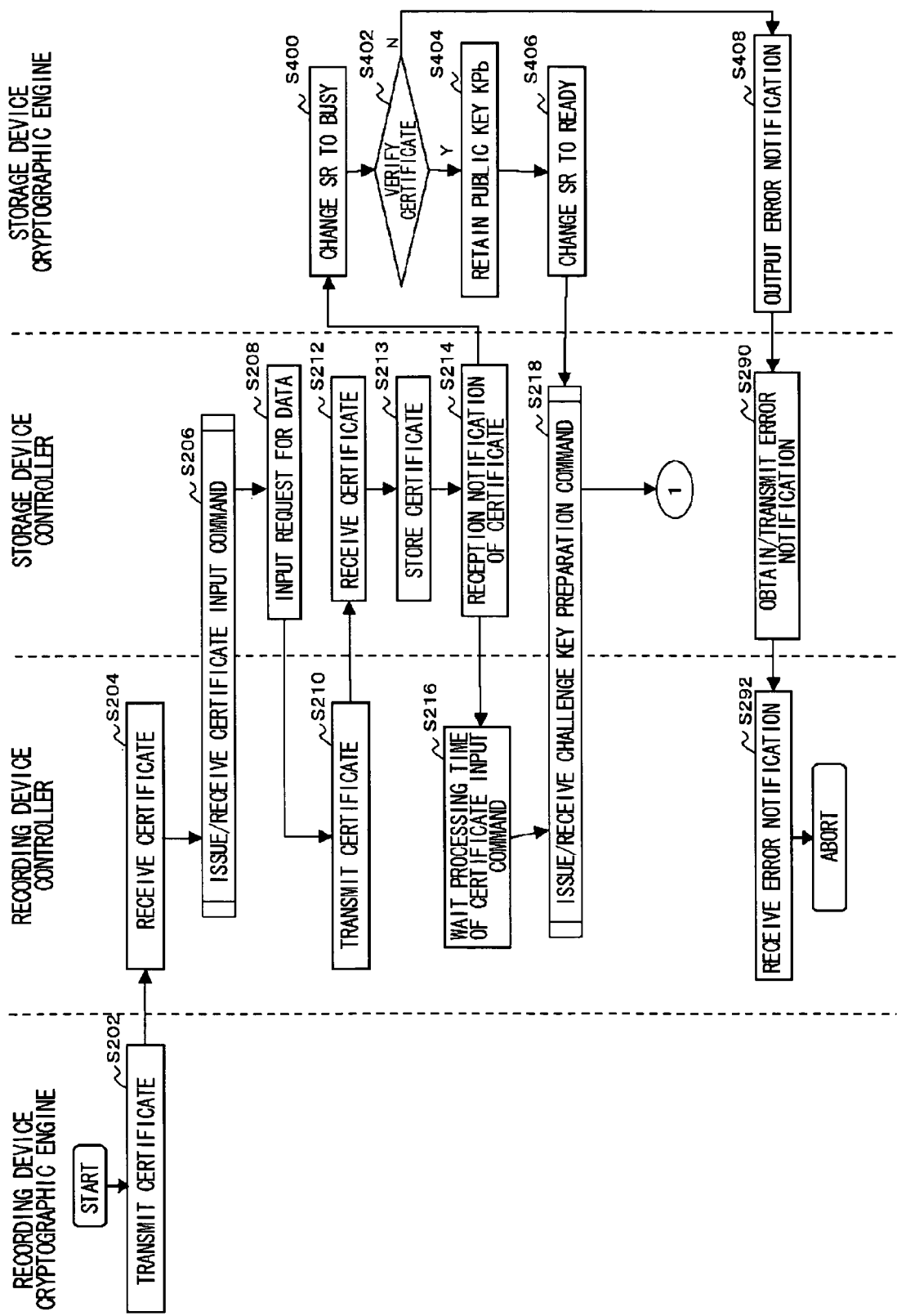
FIG. 13 is a diagram showing the procedure up to the point where the reproducing device reads license data from the storage device.
Figure 14:
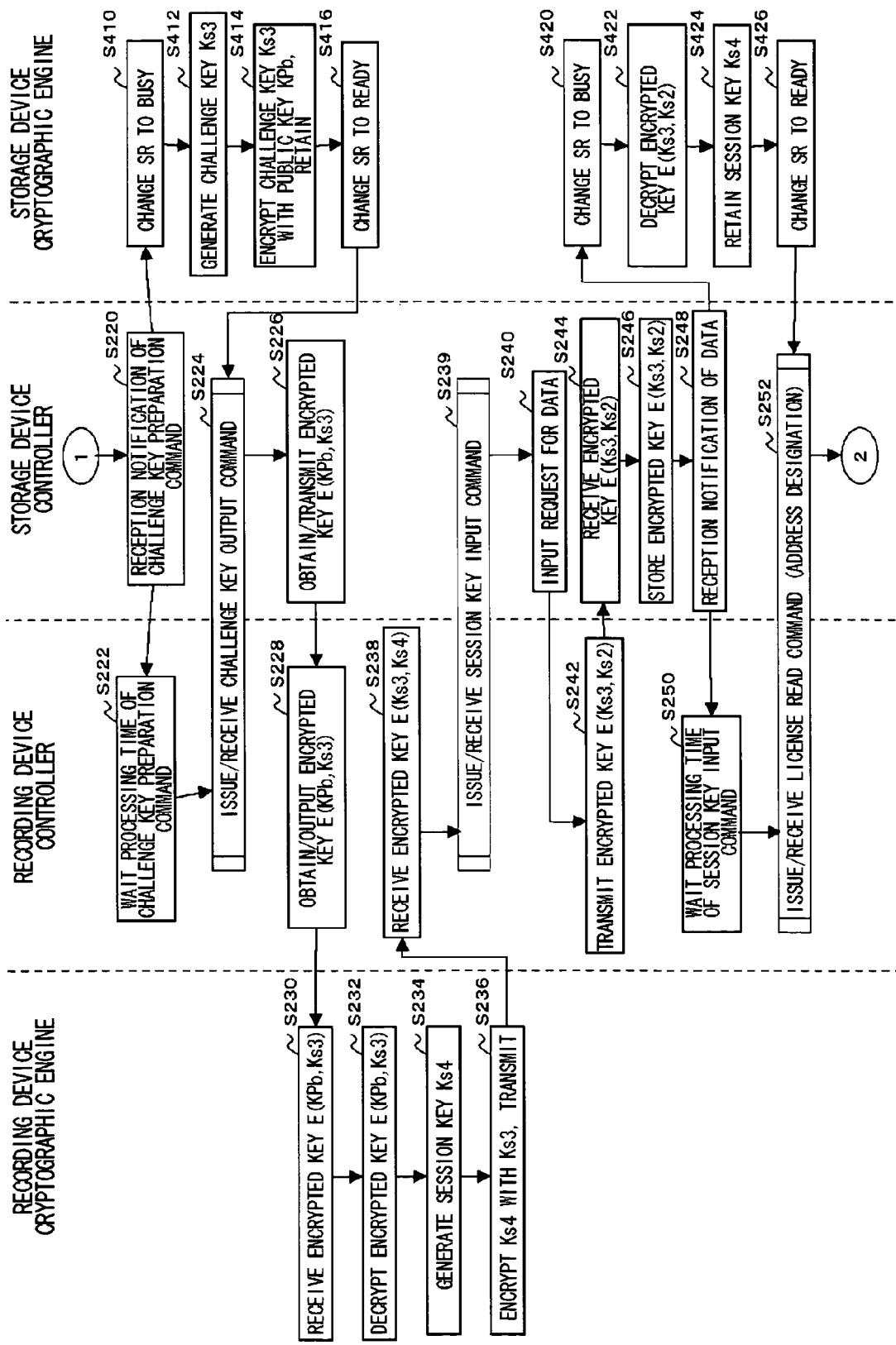
FIG. 14 is a diagram showing the procedure up to the point where the reproducing device reads license data from the storage device.
Figure 15:
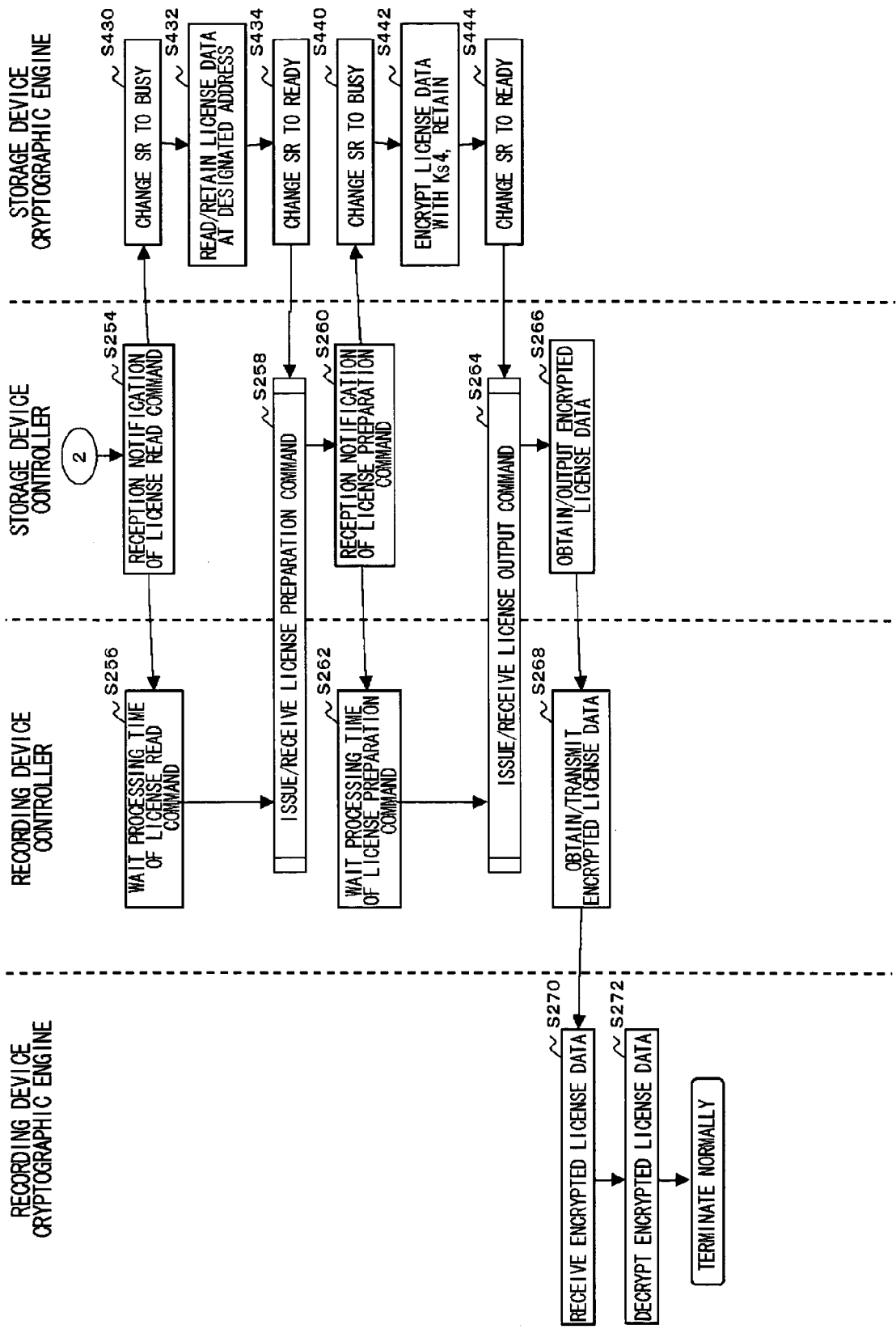
FIG. 15 is a diagram showing the procedure up to the point where the reproducing device reads license data from the storage device.

FIGS. 13, 14, and 15 show the procedure up to the point where the reproducing device 300 reads license data from the storage device 200. Initially, the cryptographic engine 303 of the reproducing device 300 transmits the certificate to the controller 301 by using the certificate output unit 320 (S202). When the controller 301 receives the certificate from the cryptographic engine 303 (S204), it issues a certificate input command to the storage device 200 (S206). When the controller 201 receives the certificate input command normally, it outputs an input request for the certificate to the controller 301 (S208). In response to this input request, the controller 301 outputs the certificate to the controller 201 (S210). The controller 201 receives the certificate (S212), stores it into the data register 220 (S213), and returns a reception notification to the controller 301 (S214).

The control unit 222 changes the status of processing of the status register 221 to "Busy" (S400). The authentication unit 226 verifies the authenticity of the certificate with the authentication key KPa (S402). If authenticity is not approved of the certificate (N at S402), the authentication unit 402 outputs an error notification (S408). The controller 201 outputs the error notification to the controller 301 (S290). The controller 301 receives the error notification (S292), and aborts the processing. If authenticity is approved of the certificate (Y at S402), the authentication unit 226 stores the public key KPb extracted from the certificate into the data register 220 (S404). The control unit 222 changes the status of processing of the status register 221 to "Ready" and the result of processing to "Normal" (S406).

Meanwhile, the controller 301 receives the reception notification of the certificate, and waits the time estimated necessary for the storage device 200 to execute the certificate input command (S216). After a lapse of the time estimated necessary to execute the certificate input command, the controller 301 issues a challenge key preparation command to the storage device 200 (S218). When the controller 201 receives the challenge key preparation command, it returns a reception notification of the challenge key preparation command to the controller 301 (S220). The controller 222 changes the status of processing of the status register 221 to "Busy" (S410). The random number generating unit 224 generates a challenge key Ks3 (S412). The first encryption unit 228 encrypts the challenge key Ks3 with the public key KPb to create an encrypted key E(KPb,Ks3), and stores it into the data register 220 temporarily (S414). After the completion of the processing, the control unit 222 changes the status of processing of the status register 221 to "Ready" and the result of processing to "Normal" (S416).

Meanwhile, the controller 301 receives the reception notification of the challenge key preparation command, and waits the time estimated necessary for the storage device 200 to execute the challenge key preparation command (S222). After a lapse of the time estimated necessary to execute the challenge key preparation command, the controller 301 issues a challenge key output command to the storage device 200 (S224). Receiving the challenge key output command, the controller 201 reads the encrypted key E(KPb,Ks3) from the data register 220 and transmits it to the controller 301 (S226).

The controller 301 receives the encrypted symmetric key E(KPb,Ks3), and transmits it to the cryptographic engine 303 (S228). When the cryptographic engine 303 receives the encrypted symmetric key E(KPb,Ks3) (S230), the first decryption unit 321 decrypts the encrypted symmetric key E(KPb,Ks3) with its own private key Kpb, thereby extracting the challenge key Ks3 (S232). Subsequently, the cryptographic engine 303 generates a session key Ks4 by using the random number generating unit 323 (S234). The cryptographic engine 303 encrypts the session key Ks4 with the challenge key Ks3 to create an encrypted symmetric key E(Ks3,Ks4) by using the encryption unit 322, and transmits the same to the controller 301 (S236). The controller 301 receives the encrypted symmetric key E(Ks3,Ks4) (S238), and issues a session key input command to the storage device 200 (S239).

When the controller 201 receives the session key input command normally, it outputs an input request for the encrypted symmetric key E(Ks3,Ks4) to the controller 301 (S240). In response to this input request, the controller 301 outputs the encrypted key E(Ks3,Ks4) to the controller 201 (S242). The controller 201 receives the encrypted key (S244), stores it into the data register 220 (S246), and returns a reception notification to the controller 301 (S248). The control unit 222 changes the status of processing of the status register 221 to "Busy" (S420), reads the challenge key Ks3 from the data register 220, and supplies the received encrypted symmetric key E(Ks3,Ks4) and the challenge key Ks3 to the second decryption unit 229. The second decryption unit 229 decrypts the encrypted symmetric key E(Ks3,Ks4) with the challenge key Ks3 to extract the session key Ks4 (S422), and stores the session key Ks4 into the data register 220 (S424). After the completion of the processing, the control unit 222 changes the status of processing of the status register 221 to "Ready" and the result of processing to "Normal" (S426).

The controller 301 receives the reception notification of the session key input command, and waits the time estimated necessary for the storage device 200 to execute the session key input command (S250). After a lapse of the time estimated necessary to execute the session key input command, the controller 301 issues a license read command to the storage device 200 (S252). Here, the address of the license data to be read is designated. When the controller 201 receives the license read command normally, it returns a reception notification of the license read command to the controller 301 (S254). The controller unit 222 changes the status of processing of the status register 221 to "Busy" (S430), reads the license data from the designated address of the confidential data storing section 205, and stores the same into the data register 220 (S432). After the completion of the processing, the control unit 222 changes the status of processing of the status register 221 to "Ready" and the result of processing to "Normal" (S434).

The controller 301 receives the reception notification of the license read command, and waits the time estimated necessary for the storage device 200 to execute the license read command (S256). After a lapse of the time estimated necessary to execute the license read command, the controller 301 issues a license preparation command to the storage device 200 (S258). When the controller 201 receives the license preparation command normally, it returns a reception notification of the license preparation command to the controller 301 (S260). The control unit 222 changes the status of processing of the status register 221 to "Busy" (S440). The second encryption unit 230 encrypts the license data with the session key Ks4 and stores the resultant into the data register 220 (S442). After the completion of the processing, the control unit 222 changes the status of processing of the status register 221 to "Ready" and the result of processing to "Normal" (S444).

The controller 301 receives the reception notification of the license preparation command, and waits the time estimated necessary for the storage device 200 to execute the license preparation command (S262). After a lapse of the time estimated necessary to execute the license preparation command, the controller 301 issues a license output command to the storage device 200 (S264). When the controller 201 receives the license output command normally, it reads the encrypted license data from the data register 220 and outputs it to the controller 301 (S266). The controller 301 obtains the encrypted license data and transmits it to the cryptographic engine 303 (S268). When the cryptographic engine 303 receives the encrypted license data (S270), the second decryption unit 324 decrypts the encrypted license data with the session key Ks4 (S272). The resulting license data is transmitted to the content decryptor 304, and is used for the content decryptor 304 to decrypt the content. Through the procedure described above, the license data for decrypting the content is read by the reproducing device 300.

The series of processing of the cryptographic engine 203 on the secure commands has been described only for situations where the result of processing of "Normal" is returned. In the cases where the processing to a secure command causes any problem and the processing is not terminated normally, the control unit 222 changes the status of processing of the status register 221 to "Ready" and the result of processing to "Error." Moreover, the transaction logs are recorded as means for restoring cryptographic input/output processing when the cryptographic input/output processing is interrupted due to the occurrence of some error. The transaction logs can be consulted to see up to which procedure the processing has proceeded, so that the processing can be resumed from the procedure where the error occurred. Here, the transaction logs are also input/output by using the secure function. Thus, commands that are issued for the input/output of the transaction logs also correspond to "secure commands." Retrieving a necessary transaction log from the log memory 125 or 231 consumes a relatively long processing time. It is thus preferable that the recording device 100 determine a wait in consideration of the time necessary for the storage device 200 to retrieve the transaction log from the log memory 231 when it issues an output command for the transaction log to the storage device 200.

Figure 16:
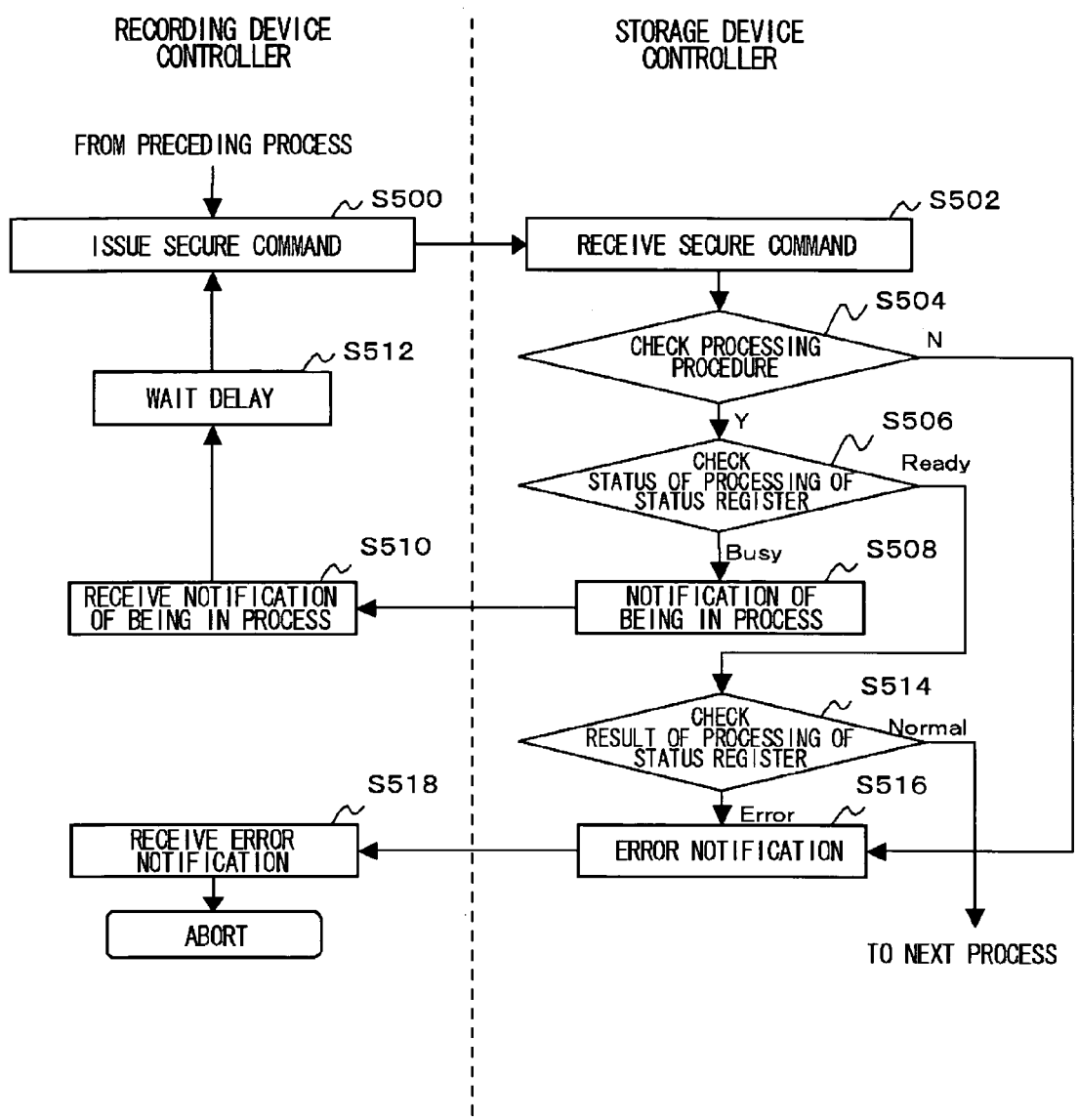
FIG. 16 is a diagram showing how the recording device issues a secure command to the storage device.

FIG. 16 shows how the recording device 100 issues a secure command to the storage device 200, and the storage device 200 receives it. The processing for issuing and receiving a secure command consists of S102, S120, S132, S142, S158, and S170 in FIGS. 9 to 11, and S206, S218, S224, S239, S252, S258, and S264 in FIGS. 12 to 15. After the controller 101 of the recording device 100 issues a secure command to the storage device 200, it waits the time estimated necessary for the storage device 200 to execute the secure command before issuing the next secure command (S500). The controller 201 of the storage device 200 receives the secure command from the recording device 100 (S502), and checks whether or not the received secure command is issued in regular procedure of issuance (S504). If not in regular procedure of issuance (N at S504), the command is unacceptable. The controller 201 thus moves to S516 to terminate the processing. If in regular procedure of issuance (Y at S504), the controller 201 consults the status register 221 to check whether or not the processing system is still executing the previous command (S506). If the status of processing of the status register 221 is "Busy," the previous command is in operation. The controller 201 thus notifies the recording device 100 of being in process (S508). When the controller 101 receives the notification of being in process from the storage device 200 (S510), it further waits a predetermined time (S512) before returning to S500 to issue a secure command.

At S504, if the status of processing of the status register 221 is "Ready," the previous command has been completed. The controller 201 thus refers to the result of processing of the status register to check the result of processing of the previous command. If the result of processing of the status register is "Normal" ("Normal" at S514), the previous command has been completed normally. The controller 201 then accepts the received secure command and moves to the next process. On the other hand, if the result of processing of the status register 221 is "Error" ("Error" at S514), the previous command is not completed normally. The controller 201 then moves to S516 to terminate the processing since it cannot proceed to the next process. In either of the cases where the command is not in regular procedure of issuance and where the previous command is not completed normally, the controller 201 issues an error notification to the recording device 100 (S516). When the controller 101 receives the error notification from the storage device 200 (S518), it aborts the processing.

Second Embodiment

Figure 17:
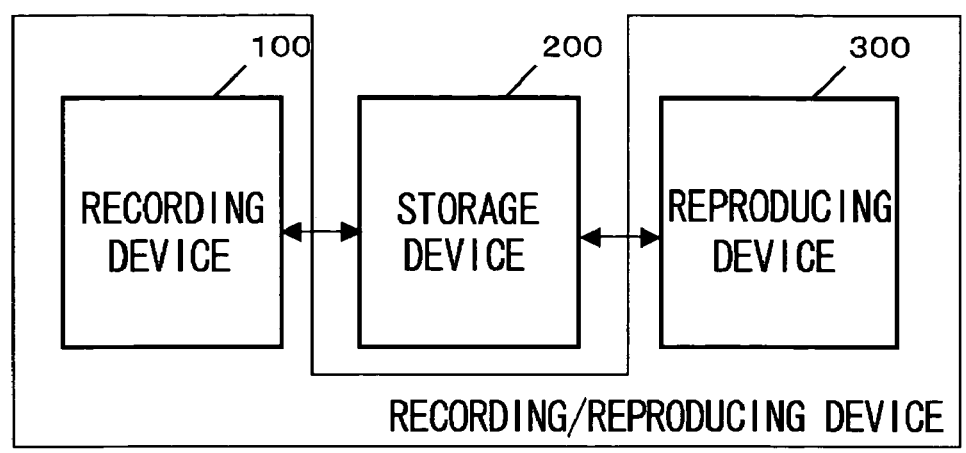
FIG. 17 is a diagram showing the overall configuration of a data management system according to a second embodiment.

FIG. 17 shows the overall configuration of a data management system 10 according to a second embodiment. In the present embodiment, the recording device 100 and the reproducing device 300 of the first embodiment is implemented as a single recording/reproducing device 400.

Figure 18:
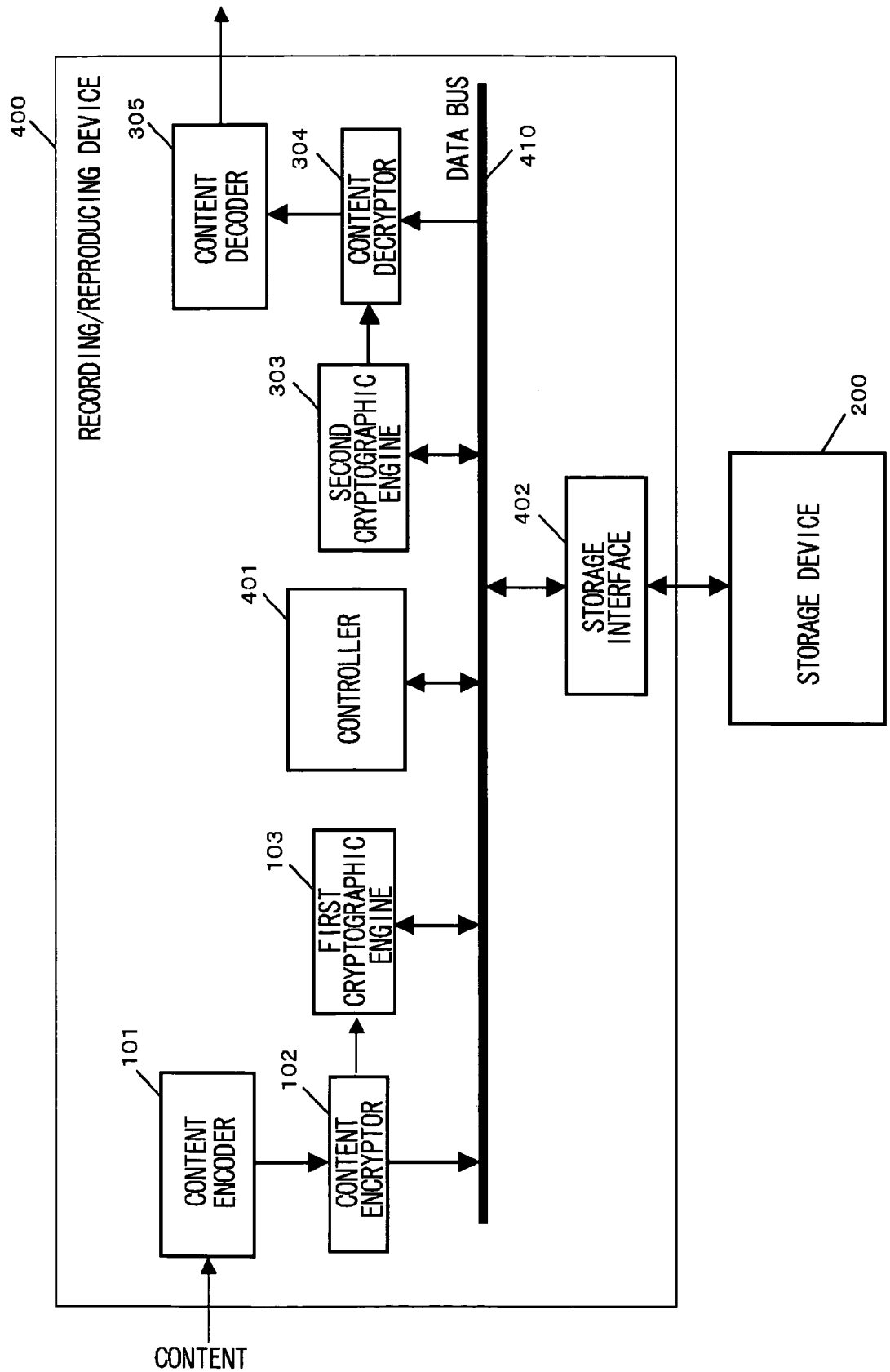
FIG. 18 is a diagram showing the internal configuration of a recording/reproducing device according to the second embodiment.

FIG. 18 shows the internal configuration of the recording/reproducing device 400 according to the present embodiment. The recording/reproducing device 400 of the present embodiment has both the configuration of the recording device 100 of the first embodiment shown in FIG. 2 and the configuration of the reproducing device 300 of the first embodiment shown in FIG. 3. The same components are designated by identical reference numerals. A first cryptographic engine 103 corresponds to the cryptographic engine 103 of the recording device 100 according to the first embodiment. A second cryptographic engine 303 corresponds to the cryptographic engine 303 of the reproducing device 300 according to the first embodiment. The internal configuration of the first cryptographic engine 103 is the same as that of the cryptographic engine 103 of the first embodiment shown in FIG. 5. The internal configuration of the second cryptographic engine 303 is the same as that of the cryptographic engine 300 of the first embodiment shown in FIG. 6. A controller 401 has the functions of both the controller 101 of the recording device 100 and the controller 301 of the reproducing device 300 according to the first embodiment. A storage interface 402 controls input/output of data to/from the storage device 200. A data bus 410 connects components of the recording/reproducing device 400 electrically.

The recording/reproducing device 400 of the present embodiment makes the same operations as in the first embodiment. More specifically, the operations are the same as those described in the first embodiment, wherein the recording device 100 is replaced with the recording/reproducing device 400, the cryptographic engine 103 the first cryptographic engine 103, the controller 101 the controller 401, the reproducing device 300 the recording/reproducing device 400, the cryptographic engine 103 the second cryptographic engine 303, and the controller 301 the controller 401.

Third Embodiment

Figure 19:
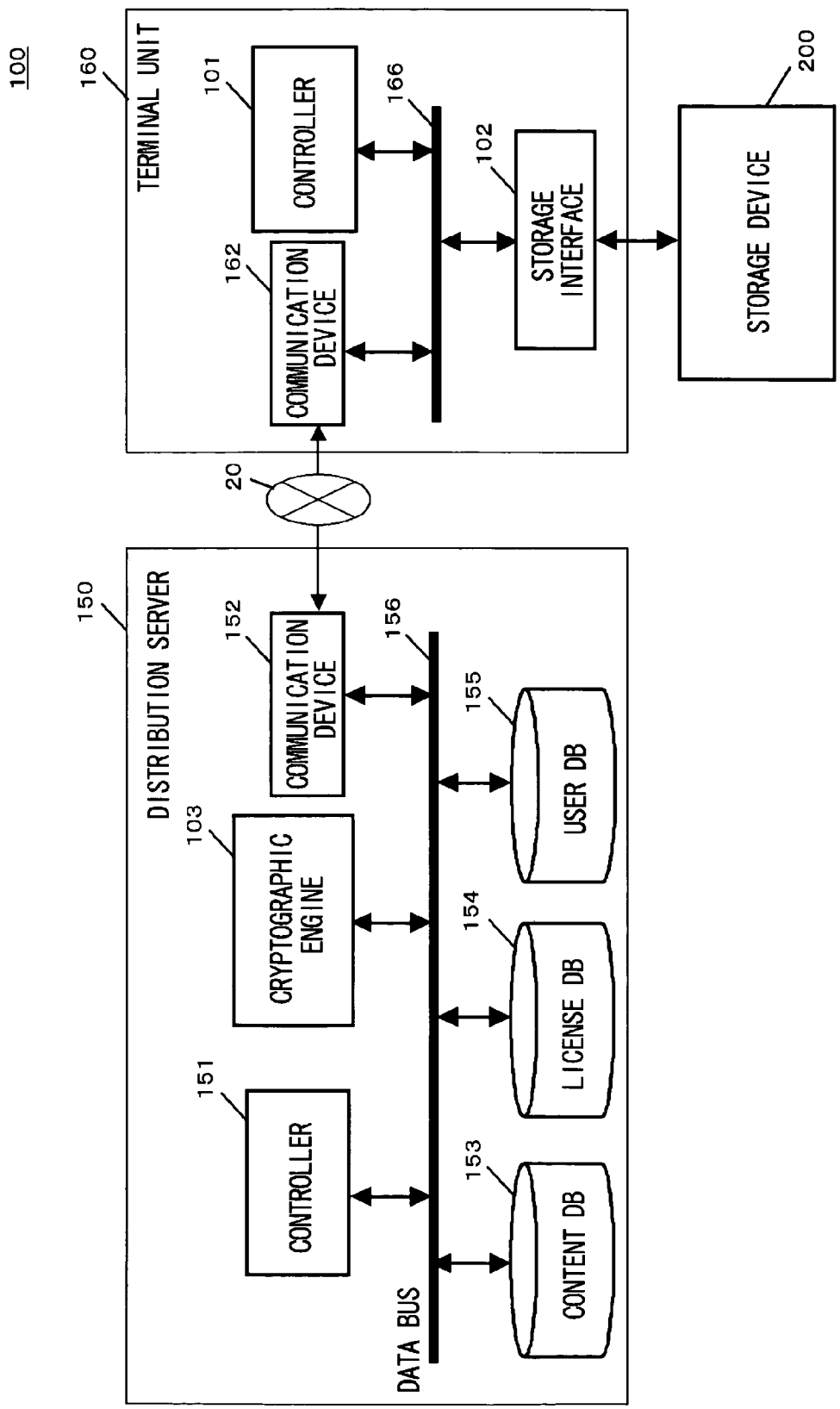
FIG. 19 is a diagram showing the internal configuration of a recording device according to a third embodiment.

FIG. 19 shows the internal configuration of the recording device 100 according to a third embodiment. In the present embodiment, the recording device 100 of the first embodiment is implemented as a distribution server 150 which distributes contents and a terminal unit 160 to which the contents are provided. The distribution server 150 comprises a cryptographic engine 103, a communication device 152, a content database 153, a license database 154, a user database 155, a controller 151 which controls these components, and a data bus 156 which connects these components electrically. The terminal unit 160 comprises a controller 101, a storage interface 102, a communication device 162, and a data bus 166 which connects these components electrically. The distribution server 150 and the terminal unit 160 are connected with each other through the communication devices 152 and 162, respectively, over the Internet 20 which is an example of the network. The cryptographic engine 103 of the distribution server 150 has the same functions as those of the cryptographic engine 103 of the first embodiment. The controller 101 and the storage interface 102 of the terminal unit 160 have the same functions as those of the controller 101 and the storage interface 102 of the first embodiment, respectively.

The content database 153 retains content to be provided for users. The license database 154 retains license data including the content keys for use in encrypting the content.

In the present embodiment, the content is previously encrypted with the content keys and stored in the content database 153. Nevertheless, the content data yet be encrypted may be stored in the content database 153, in which case the distribution server 150 is further provided with the content encoder 105 and the content encryptor 104 of the first embodiment so that the content data is read from the content database 153 for encoding and encryption. The user database 155 retains information on users for whom the content is provided. For example, the user database 155 may retain users' personal information, the address of the terminal unit 160, content purchase history, accounting information, etc. The controller 151 reads encrypted content from the content database 153 according to requests from users, and provides the same to the users. When the cryptographic engine 103 provides license data for decrypting the content to the users, the controller 151 updates the user database 155 to charge the price of the content.

The procedures for the cryptographic input/output processing of the present embodiment are the same as in the first embodiment. In the present embodiment, the communications between the cryptographic engine 103 and the controller 101 are conducted over the Internet 20. This means a higher possibility of data leak as compared to the first embodiment where the communications are conducted within the same device. Nevertheless, as described in FIGS. 9 to 15, data is always encrypted when exchanged between the cryptographic engine 103 and the controller 101. It is therefore possible to achieve high anti-tampering facilities.

Fourth Embodiment

Figure 20:
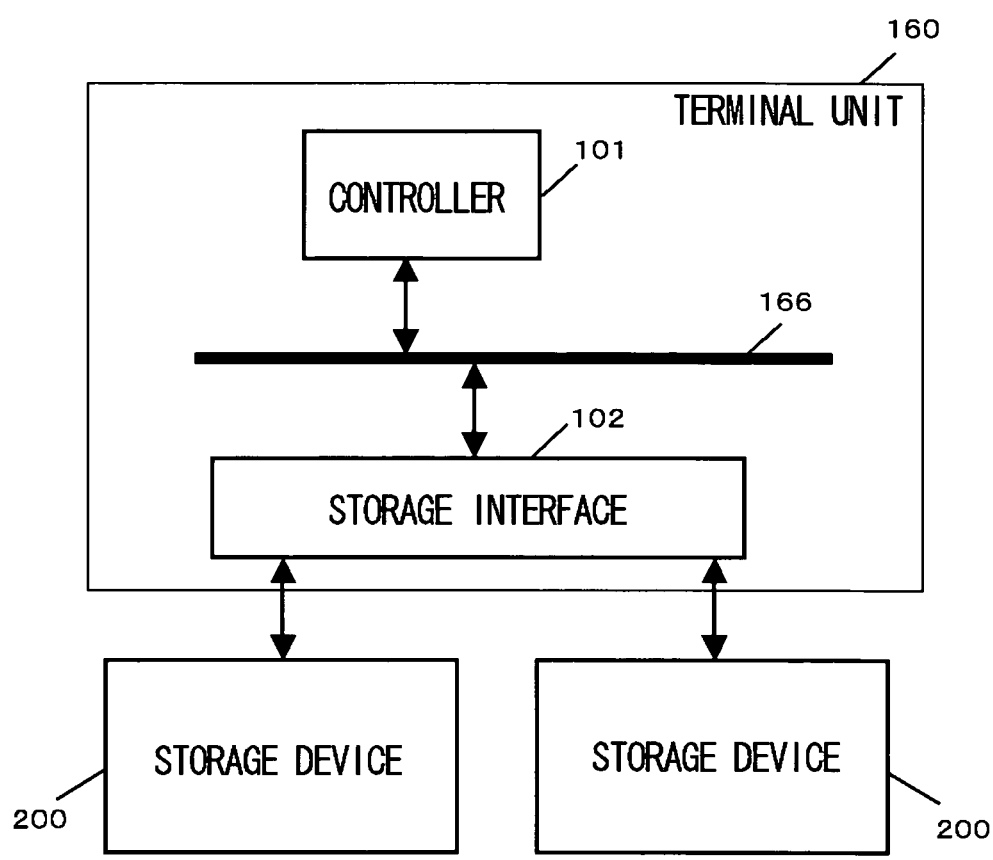
FIG. 20 is a diagram showing the internal configuration of a terminal unit according to a fourth embodiment.

FIG. 20 shows the internal configuration of a terminal unit 160 according to a fourth embodiment. The present embodiment deals with the case where the terminal unit 160 of the third embodiment reads license data from one of storage devices 200 and transmits it to the other storage device 200. More specifically, the terminal unit 160 functions as a reproducing device 300 to one of the storage devices 200, and as a recording device 100 to the other storage device 200. In each case, the operations are the same as in the first embodiment.

Up to this point, the present invention has been described in conjunction with the embodiments. These embodiments have been given solely by way of illustration. It will be understood by those skilled in the art that various modifications may be made to combinations of the foregoing components and processes, and all such modifications are also intended to fall within the scope of the present invention.

In the embodiments, the functional blocks for performing encryption and decryption in each cryptographic engine are shown separately, whereas these components may share some of the circuitry. This can suppress the hardware scale, contributing to miniaturization and a reduction in power consumption.

Although the present invention has been described by way of exemplary embodiments, it should be understood that many changes and substitutions may further be made by those skilled in the art without departing from the scope of the present invention which is defined by the appended claims.

What is claimed is:

1. A host device operative to input data to a removable storage device provided with a first encryption unit and output data from the storage device, the host device comprising:
   a second encryption unit configured to perform a host-device side process of a series of cryptographic processing for encrypting data to be secured; and
   a controller which
   divides the series of cryptographic processing into a plurality of procedures, and divides the plurality of procedures into procedures to be executed in the first encryption unit and procedures to be executed in the second encryption unit, and
   issues to the storage device a command for controlling the first encryption unit to execute the procedures to be executed in the first encryption unit,
   wherein the controller obtains information for estimating time necessary to execute the command from the storage device prior to the issuance of the command, sets a wait time for the command based on the obtained information, issues the command to the storage device via a bus electrically connecting the host device and the storage device, releases the bus for another command, and waits the time set for the command before it issues a command for the next procedure to the storage device, in order to have the next procedure executed by the first encryption unit, and
   wherein the information for estimation is selected from the group consisting of a typical processing time, an average processing time, and a maximum processing time necessary to execute the command.

2. The host device according to claim 1, wherein
   the information for estimation is selected from the group consisting of the typical processing time, the average processing time, and the maximum processing time necessary for at least one basic process out of an encrypting operation, a decrypting operation, a hash operation, a random number generating operation, and log retrieval which are used to execute the command.

3. A method for executing a series of cryptographic processing for encrypting data to be secured and inputting or outputting the data between a removable storage device provided with a first encryption unit and a host device provided with a second encryption unit, comprising;
   dividing the cryptographic processing into a plurality of procedures, and dividing the plurality of procedures into procedures to be executed in the first encryption unit and procedures to be executed in the second encryption unit;
   allowing the second encryption unit to execute the procedures to be executed in the second encryption unit;
   allowing the host device to issue a command to the storage device in order to control the first encryption unit to execute the procedures to be executed in the first encryption unit;
   allowing the storage device to receive the command; and
   allowing the first encryption unit to execute the command,
   wherein the host device obtains information for estimating time necessary for the storage device to execute the command from the storage device prior to the issuance of the command, issues the command to the storage device via a bus electrically connecting the host device and the storage device, releases the bus for another command, and waits the time estimated necessary to execute the command before it issues a command for the next procedure to the storage device, in order to have the next procedure executed by the first encryption unit, and
   wherein the information for estimation is selected from the group consisting of a typical processing time, an average processing time, and a maximum processing time necessary to execute the command.

4. The method according to claim 3, wherein the cryptographic processing is divided into any of process units, the divided process units including:
   receiving data input from the host device and performing encryption or decryption using the cryptographic processing unit if necessary;
   performing encryption, decryption, or signature attachment using the cryptographic processing unit in order to output data to the host device; and
   outputting data to the host device, and the command is issued by each of the process units divided.

5. The method according to claim 3, wherein
   the information for estimation is selected from the group consisting of the typical processing time, the average processing time, the maximum processing time necessary for at least one basic process out of an encrypting operation, a decrypting operation, a hash operation, a random number generating operation, and log retrieval which are used to execute the command.

6. The method according to claim 4, wherein
   the information for estimation is selected from the group consisting of the typical processing time, the average processing time, and the maximum processing time necessary for at least one basic process out of an encrypting operation, a decrypting operation, a hash operation, a random number generating operation, and log retrieval which are used to execute the command.

* * * * *